US011583959B2

(12) United States Patent
Kawasaki et al.

(10) Patent No.: US 11,583,959 B2
(45) Date of Patent: Feb. 21, 2023

(54) SOLDER ALLOY, SOLDER POWER, AND SOLDER JOINT

(71) Applicant: SENJU METAL INDUSTRY CO., LTD., Tokyo (JP)

(72) Inventors: Hiroyoshi Kawasaki, Tokyo (JP); Osamu Munekata, Tokyo (JP); Masato Shiratori, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 5 days.

(21) Appl. No.: 17/426,137

(22) PCT Filed: Jan. 31, 2020

(86) PCT No.: PCT/JP2020/003713
§ 371 (c)(1),
(2) Date: Jul. 28, 2021

(87) PCT Pub. No.: WO2020/240927
PCT Pub. Date: Dec. 3, 2020

(65) Prior Publication Data
US 2022/0088722 A1 Mar. 24, 2022

(30) Foreign Application Priority Data
May 27, 2019 (JP) .............................. JP2019-098952

(51) Int. Cl.
B23K 35/26 (2006.01)
C22C 13/00 (2006.01)
B23K 35/02 (2006.01)
B23K 103/08 (2006.01)

(52) U.S. Cl.
CPC ........ B23K 35/262 (2013.01); B23K 35/0244 (2013.01); C22C 13/00 (2013.01); *B23K 2103/08* (2018.08)

(58) Field of Classification Search
None
See application file for complete search history.

(56) References Cited

U.S. PATENT DOCUMENTS

| 6,416,590 B1 | 7/2002 | Hirata et al. | |
| 10,376,994 B2* | 8/2019 | Albrecht | B23K 35/262 |
| 2003/0196732 A1* | 10/2003 | Carey, II | C23C 2/06 |
| | | | 428/685 |
| 2014/0186208 A1 | 7/2014 | Akagi et al. | |
| 2015/0146394 A1 | 5/2015 | Terashima et al. | |
| 2015/0217408 A1* | 8/2015 | Kawasaki | B23K 35/262 |
| | | | 174/126.2 |
| 2016/0271738 A1* | 9/2016 | Murphy | B23K 1/00 |
| 2021/0308808 A1 | 10/2021 | Kawasaki et al. | |

FOREIGN PATENT DOCUMENTS

| CN | 1315895 | 10/2001 | |
| CN | 103124614 | 5/2013 | |
| CN | 103561903 | 2/2014 | |
| CN | 103889644 | 6/2014 | |
| CN | 105283267 | 1/2016 | |
| CN | 109014652 | 12/2018 | |
| CN | 109290696 | 2/2019 | |
| JP | 2002-224881 | 8/2002 | |
| JP | 2013184169 A * | 9/2013 | |
| JP | 2013-237091 | 11/2013 | |
| JP | 2015-098052 | 5/2015 | |
| JP | 2015098052 A * | 5/2015 | ............. B23K 35/26 |
| JP | 2017-192987 | 10/2017 | |
| JP | 6521160 | 5/2019 | |
| JP | B-6521161 | 5/2019 | |
| JP | 2020-192573 | 12/2020 | |
| WO | WO-2013/108421 | 7/2013 | |
| WO | WO-2014/192521 | 12/2014 | |
| WO | WO-2017192517 A1 * | 11/2017 | ........... B23K 35/262 |

OTHER PUBLICATIONS

International Search Report for PCT/JP2020/003713, dated Apr. 21, 2020.
Written Opinion for PCT/JP2020/003713, dated Apr. 21, 2020.
Notice of Reasons for Rejection for JP-2019-098952, dated Aug. 27, 2019.
China Office Action for 202080015741.0, dated Dec. 16, 2021, 17 pages.
Korean Notice of Allowance (Application No. 10-2021-7029140) dated Feb. 24, 2022 (4 pages).

* cited by examiner

*Primary Examiner* — Devang R Patel
(74) *Attorney, Agent, or Firm* — Nixon Peabody LLP; Jeffrey L. Costellia

(57) ABSTRACT

A solder alloy is provided which suppresses the change in a solder paste over time, decreases the temperature difference between the liquidus-line temperature and the solidus temperature, and exhibits a high reliability. The solder alloy has an alloy constitution composed of: 10 ppm by mass or more and less than 25 ppm by mass of As; at least one selected from the group consisting of 0 ppm by mass to 10000 ppm by mass of Bi and 0 ppm by mass to 5100 ppm by mass of Pb; more than 0 ppm by mass and no more than 3000 ppm by mass of Sb; and a remaining amount of Sn; and satisfies both the formula (1) and the formula (2).

$$300 \le 3As+Sb+Bi+Pb \tag{1}$$

$$0.1 \le \{(3As+Sb)/(Bi+Pb)\} \times 100 \le 200 \tag{2}$$

In the formula (1) and the formula (2), As, Sb, Bi, and Pb each represents an amount thereof (ppm by mass) in the alloy constitution.

11 Claims, No Drawings

# SOLDER ALLOY, SOLDER POWER, AND SOLDER JOINT

TECHNICAL FIELD

The present invention relates to a solder alloy which suppresses the change in a paste over time, exhibits excellent wettability, and decreases the temperature difference between the liquidus-line temperature and the solidus temperature, as well as a solder powder and a solder joint.

BACKGROUND OF THE INVENTION

In recent years, an electronic device having a solder joint such as CPU (Central Processing Unit) has been required to be smaller and more sophisticated. It is necessary to miniaturize a printed board and an electrode of an electronic device to achieve the request. Since an electronic device is connected to a printed board via an electrode, the size of a solder joint used to connect both of them is reduced to realize the miniaturization of the electrode.

A solder paste is commonly used to connect an electronic device and a printed board through such a fine electrode. The solder paste is supplied by printing on an electrode of a printed board. The solder paste is printed by placing a metal mask provided with an opening on the printed board, moving a squeegee while pressing the squeegee against the metal mask, and collectively applying the solder paste from the opening of the metal mask to the electrode on the printed board. In addition, in the case where the solder paste is purchased, it is not normally used up in a single print. Thus, the solder paste is required to maintain an initial moderate viscosity to ensure that the print performance on a board is not impaired.

In recent years, however, the narrowing of an area to be printed with a solder paste has progressed along with the miniaturization of an electrode, thereby prolonging the time required to use up the purchased solder paste. A solder paste is a kneaded mixture of a solder powder and a flux. In the case where a solder paste is stored for a long time, the viscosity of the solder paste may increase depending on the storage conditions, and print performance at the time of purchase may not be achieved.

For example, Patent Document 1 discloses a solder alloy containing: Sn; and at least one selected from the group consisting of Ag, Bi, Sb, Zn, In, and Cu, and further containing a predetermined amount of As, in order to suppress changes in the solder paste over time. Patent Document 1 shows that the viscosity after 2 weeks at 25° C. is less than 140% of the viscosity immediately after preparation.

DOCUMENTS OF RELATED ART

Patent Documents

Patent Document 1: Japanese Unexamined Patent Application Publication No. 2015-98052

SUMMARY OF THE INVENTION

Problems to be Solved by the Invention

As described above, the invention described in Patent Document 1 is a solder alloy that can selectively contain six elements in addition to Sn and As. In addition, Patent Document 1 shows that the fusibility is deteriorated when the amount of As is high.

Here, the fusibility evaluated in Patent Document 1 is considered to correspond to the wettability of the molten solder. The fusibility disclosed in Patent Document 1 is evaluated in terms of the presence or absence of solder powder that cannot be made molten by conducting microscopic observation of the external appearance of the melt. This is because it becomes difficult for the solder powder to remain unmolten along with an increase in the wettability of the molten solder.

In general, a flux having a high activity is required to improve the wettability of the molten solder. It is considered that a flux having a high activity may be used as a flux described in Patent Document 1 in order to suppress the deterioration in the wettability caused by As. However, the use of the flux having a high activity promotes the reaction of a solder alloy and an active agent, thereby increasing the viscosity of a paste. Furthermore, it is necessary to increase the amount of As in order to suppress an increase in the viscosity, in view of the description in Patent Document 1. The continuous increase in both the activity of the flux and the amount of As is required to realize further low viscosity increase rate and excellent wettability of the solder paste described in Patent Document 1, thereby causing a vicious cycle.

Recently, a solder paste is required to maintain a stable performance for a long period of time, regardless of the environment in which the solder paste is used or stored, and to exhibit further high wettability along with the miniaturization of a solder joint. As described above, a vicious cycle is inevitable in an attempt to respond to recent demands using the solder paste described in Patent Document 1.

In addition, the mechanical properties of a solder joint are required to be improved in order to connect fine electrodes. An increase in the amount of some elements causes an increase in the liquidus-line temperature, expansion of the liquidus-line temperature and the solidus temperature, and segregation during solidification, which result in the formation of a heterogeneous alloy structure. In the case where a solder alloy has such an alloy structure, the solder joint is easily broken by external stress due to the deterioration of the mechanical properties, such as tensile strength. This problem has become significant along with the miniaturization of an electrode in recent years.

The present invention aims to provide a solder alloy which suppresses the change in a solder paste over time, exhibits excellent wettability, decreases the temperature difference between the liquidus-line temperature and the solidus temperature, and exhibits high mechanical properties, as well as a solder powder and a solder joint.

Means to Solve the Problems

In the case where both the suppression of the change in a paste over time and the improvement in the wettability are realized, it is necessary to avoid a vicious cycle due to the use of a flux having a high activity and the increase in the amount of As. The inventors of the present invention focused on the alloy constitution of a solder powder, and conducted an intensive investigation to realize both the suppression of the change in a paste over time and the improvement in the wettability.

First, the inventors of the present invention studied a solder powder containing Sn, Sn—Cu, and Sn—Ag—Cu solder alloy, conventionally used as a solder alloy, as the basic constitution, and further containing As. In addition, the amount of As was investigated by focusing on the cause of the suppression of the change in a solder paste over time when the solder powder is used.

The increase in the viscosity of a solder paste over time may be caused by the reaction of a solder powder and a flux. It is shown from the comparison of the results of Example 4 with those of Comparative Example 2 in Table 1 of Patent Document 1 that the viscosity increase rate is lower when the amount of As exceeds 100 ppm by mass. In view of these results, when an effect of suppressing the change in a paste over time (hereinafter, referred to as the "viscosity-increase suppression effect" as appropriate) is taken into consideration, the amount of As may be further increased. However, when the amount of As is increased, the viscosity-increase suppression effect is slightly increased along with the amount of As, but the viscosity increase suppression effect is not exhibited depending on the increased amount of As. This is probably because there is a limit on the amount of As to be concentrated on the surface of the solder alloy, and even if the predetermined amount or more of As is contained, the amount of As inside the solder alloy is increased, which makes it difficult to exhibit the viscosity-increase suppression effect. In addition, it is confirmed that the wettability of the solder alloy deteriorates when the amount of As is excessively high.

Thus, the inventors of the present invention came to realize the necessity of expanding the range of the amount of As to the extent that the amount of As is so low that the viscosity-increase suppression effect is not exerted conventionally, and then adding elements that exert the viscosity-increase suppression effect in addition to As, and investigated various elements. As a result, it was found fortuitously that Sb, Bi and Pb exhibit the same effect as that of As. Although the reason for this is not certain, it is assumed as follows.

Since the viscosity-increase suppression effect is exerted by inhibiting the reaction with a flux, elements having a low ionization tendency are mentioned as elements having a low reactivity with a flux. In general, the ionization of an alloy is considered in terms of the ionization tendency, that is, the standard electrode potential, of an alloy constitution. For example, a Sn—Ag alloy containing a noble Ag relative to Sn is more difficult to ionize than Sn. Accordingly, an alloy containing a noble element relative to Sn is more difficult to ionize than Sn, and it is assumed that the viscosity-increase suppression effect of a solder paste is high.

Although Patent Document 1 discloses Bi, Sb, Zn, and In are mentioned as equivalent elements in addition to Sn, Ag, and Cu, Zn is the most base element among these elements and is a more base element than Sn in terms of the ionization tendency. In other words, Patent Document 1 describes that even the addition of Zn, which is the most base element, exhibits the viscosity-increase suppression effect. Therefore, it is considered that a solder alloy containing an element selected according to the ionization tendency exhibits at least an equivalent viscosity-increase suppression effect in comparison with a solder alloy described in Patent Document 1. In addition, as described above, the wettability deteriorates along with the increase in the amount of As.

The inventors of the present invention investigated in detail Bi and Pb which exert the viscosity-increase suppression effect. In the case where the heating temperature of a solder alloy is constant, Bi and Pb improve the wettability of a solder alloy, because Bi and Pb reduce the liquidus-line temperature of the solder alloy. However, the solidus temperature decreases significantly depending on the amount thereof, so the $\Delta T$, which is the temperature difference between the liquidus-line temperature and the solidus temperature, becomes excessively large. In the case where the $\Delta T$ becomes excessively large, segregation occurs during solidification, which results in the deterioration of mechanical properties such as mechanical strength. The $\Delta T$ spreading phenomenon is prominent when Bi and Pb are added simultaneously, and therefore strict control is necessary.

Although the inventors of the present invention re-investigated the amounts of Bi and Pb in order to improve the wettability of a solder alloy, the $\Delta T$ increased along with the increase in the amount of these elements. Accordingly, the inventors of the present invention selected Sb as an element whose ionization tendency is noble relative to that of Sn and which improves the wettability of a solder alloy to determine the acceptable range of the Sb amount and investigated in detail the relationship of the amount of each of As, Bi, Pb, and Sb. As a result, it was found by chance that in the case where the amounts of these element satisfy a predetermined relationship, practically acceptable levels of the viscosity-increase suppression effect, wettability, and narrowing of the $\Delta T$ were exhibited, thereby completing the present invention.

The present invention resulting from these findings is as follows.

(1) A solder alloy characterized by having an alloy constitution containing: 10 ppm by mass or more and less than 25 ppm by mass of As; at least one selected from the group consisting of 0 ppm by mass to 10000 ppm by mass of Bi and 0 ppm by mass to 5100 ppm by mass of Pb; more than 0 ppm by mass and no more than 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(2) A solder alloy characterized by having an alloy constitution containing: 10 ppm by mass or more and less than 25 ppm by mass of As; at least one selected from the group consisting of more than 0 ppm by mass and no more than 10000 ppm by mass of Bi and more than 0 ppm by mass and no more than 5100 ppm by mass of Pb; more than 0 ppm by mass and no more than 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(3) A solder alloy characterized by having an alloy constitution containing: 10 ppm by mass or more and less than 25 ppm by mass of As; at least one selected from the group consisting of 50 ppm by mass to 10000 ppm by mass of Bi and more than 0 ppm by mass and no more than 5100 ppm by mass of Pb; more than 0 ppm by mass and no more than 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(4) A solder alloy characterized by having an alloy constitution containing: 10 ppm by mass or more and less than 25 ppm by mass of As; at least one selected from the group consisting of more than 0 ppm by mass and no more than 10000 ppm by mass of Bi and 50 ppm by mass to 5100 ppm by mass of Pb; more than 0 ppm by mass and no more than 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(5) A solder alloy characterized by having an alloy constitution containing: 10 ppm by mass or more and less than 25 ppm by mass of As; at least one selected from the group consisting of more than 0 ppm by mass and no more than 10000 ppm by mass of Bi and more than 0 ppm by mass and no more than 5100 ppm by mass of Pb; 50 ppm by mass to 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(6) A solder alloy characterized by having an alloy constitution containing: 10 ppm by mass or more and less than 25 ppm by mass of As; at least one selected from the group consisting of 50 ppm by mass to 10000 ppm by mass of Bi and 50 ppm by mass to 5100 ppm by mass of Pb; more than 0 ppm by mass and no more than 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(7) A solder alloy characterized by having an alloy constitution containing: 10 ppm by mass or more and less than 25 ppm by mass of As; at least one selected from the group consisting of more than 0 ppm by mass and no more than 10000 ppm by mass of Bi and 50 ppm by mass to 5100 ppm by mass of Pb; 50 ppm by mass to 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(8) A solder alloy characterized by having an alloy constitution containing: 10 ppm by mass or more and less than 25 ppm by mass of As; at least one selected from the group consisting of 50 ppm by mass to 10000 ppm by mass of Bi and more than 0 ppm by mass and no more than 5100 ppm by mass of Pb; 50 ppm by mass to 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(9) A solder alloy characterized by having an alloy constitution containing: 10 ppm by mass or more and less than 25 ppm by mass of As; at least one selected from the group consisting of 50 ppm by mass to 10000 ppm by mass of Bi and 50 ppm by mass to 5100 ppm by mass of Pb; 50 ppm by mass to 3000 ppm by mass of Sb; and a remaining amount of Sn, wherein both a formula (1) and a formula (2) are satisfied:

$$300 \leq 3As+Sb+Bi+Pb \tag{1}$$

$$0.1 \leq \{(3As+Sb)/(Bi+Pb)\} \times 100 \leq 200 \tag{2}$$

in the formula (1) and the formula (2), As, Sb, Bi, and Pb each represents an amount thereof (ppm by mass) in the alloy constitution.

(10) The solder alloy according to any one of (1) to (9) mentioned above, wherein the alloy constitution further contains 0 ppm by mass to 600 ppm by mass of Ni.

(11) The solder alloy according to any one of (1) to (9) mentioned above, wherein the alloy constitution further contains 0 ppm by mass to 100 ppm by mass of Fe.

(12) The solder alloy according to any one of (1) to (9) mentioned above, wherein the alloy constitution further contains 0 ppm by mass to 1200 ppm by mass of In.

(13) The solder alloy according to any one of (1) to (9) mentioned above, wherein the alloy constitution further contains at least two selected from the group consisting of 0 ppm by mass to 600 ppm by mass of Ni, 0 ppm by mass to 100 ppm by mass of Fe, and 0 ppm by mass to 1200 ppm by mass of In, and a formula (4) is satisfied, $$0 \leq Ni+Fe \leq 680 \tag{4}$$

in the formula (4), Ni and Fe each represents an amount thereof (ppm) in the alloy constitution.

(14) The solder alloy according to any one of (1) to (9) mentioned above, wherein the alloy constitution further contains 0 ppm by mass to 600 ppm by mass of Ni and 0 ppm by mass to 100 ppm by mass of Fe, and both a formula (3) and a formula (4) are satisfied, $$0 \leq Ni/Fe \leq 50 \tag{3}$$

$$0 \leq Ni+Fe \leq 680 \tag{4}$$

in the formula (3) and the formula (4), Ni and Fe each represents an amount thereof (ppm by mass) in the alloy constitution.

(15) The solder alloy according to any one of (1) to (14) mentioned above, wherein the alloy constitution further satisfies a formula (1a), $$300 \leq 3As+Sb+Bi+Pb \leq 18214 \tag{1a}$$

in the formula (1a), As, Sb, Bi and Pb each represents an amount thereof (ppm by mass) in the alloy constitution.

(16) The solder alloy according to any one of (1) to (15) mentioned above, wherein the alloy constitution further satisfies a formula (2a), $$0.1 \leq \{(3As+Sb)/(Bi+Pb)\} \times 100 \leq 158.5 \tag{2a}$$

in the formula (2a), As, Sb, Bi and Pb each represents an amount thereof (ppm by mass) in the alloy constitution.

(17) The solder alloy according to any one of (1) to (16) mentioned above, wherein the alloy constitution further contains at least one selected from the group consisting of 0% by mass to 4% by mass of Ag and 0% by mass to 0.9% by mass of Cu.

(18) A solder powder consisting of the solder alloy of any one of (1) to (17) mentioned above.

(19) A solder joint formed by the solder alloy of any one of (1) to (17) mentioned above (in which no solder alloy other than the solder alloy of any one of (1) to (17) mentioned above is contained).

EMBODIMENTS FOR CARRYING OUT THE INVENTION

The present invention is explained in more detail below. In the present specification, "ppm" used in a solder alloy constitution means "ppm by mass", and "%" means "% by mass", unless otherwise specified.

1. Alloy Constitution (1) 10 ppm or More and Less than 40 ppm of As

As is an element that can suppress the change in viscosity of the solder paste over time. It is assumed that As has a low reactivity with a flux and is a noble element relative to Sn, and thus can exert a viscosity-increase suppression effect. In the case where the amount of As is less than 10 ppm, the viscosity-increase suppression effect is not sufficiently exerted. The lower limit of the amount of As is 10 ppm or more, and preferably 14 ppm or more. In contrast, in the case where the amount of As is excessively high, the wettability of a solder alloy deteriorates depending on the activity of a flux. The upper limit of the amount of As is less than 40 ppm, preferably 38 ppm or less, more preferably less than 25 ppm, even more preferably 24 ppm or less, and particularly preferably 18 ppm or less.

(2) At Least One of 0 ppm to 10000 ppm of Bi, 0 ppm to 5100 ppm of Pb, and 0 ppm to 3000 ppm of Sb Sb is an element that is less reactive with a flux and exhibits a viscosity-increase suppression effect. In the case where the solder alloy according to the present invention contains Sb, the lower limit of the Sb amount is 0 ppm or more, and may be more than 0 ppm, or 50 ppm or more. The Sb amount is preferably 82 ppm or more, more preferably 123 ppm or more, and even more preferably 150 ppm or more. In contrast, in the case where the Sb amount is excessively high, the wettability deteriorates, and therefore the Sb amount is required to be an appropriate amount. The upper limit of the Sb amount is 3000 ppm or less, preferably 1000 ppm or less, more preferably 700 ppm or less, and even more preferably 300 ppm or less.

Bi and Pb are elements that are less reactive with a flux and exhibit a viscosity-increase suppression effect in a similar manner to that of Sb. Bi and Pb are also elements that reduce the liquidus-line temperature of a solder alloy and also reduce the viscosity of the molten solder, thereby suppressing deterioration of the wettability due to As.

The presence of at least one selected from the group consisting of Sb, Bi and Pb contributes to suppression of deterioration of the wettability due to As. In the case where the solder alloy according to the present invention contains Bi, the lower limit of the Bi amount is 0 ppm or more, and may be more than 0 ppm, or 50 ppm or more. The Bi amount is preferably 82 ppm or more, more preferably 123 ppm or more, and even more preferably 150 ppm or more. In the case where the solder alloy according to the present invention contains Pb, the lower limit of the Pb amount is 0 ppm or more, and may be more than 0 ppm, or 50 ppm or more. The Pb amount is preferably 82 ppm or more, more preferably 123 ppm or more, even more preferably 150 ppm or more, and most preferably 250 ppm or more.

On the other hand, in the case where the amounts of these elements are excessively high, the solidus temperature decreases significantly, thereby excessively enlarging the ΔT, which is the temperature difference between the liquidus-line temperature and the solidus temperature. In the case where the ΔT is excessively large, a high melting-point crystalline phase in which the amounts of Bi and Pb are low precipitates during the solidification process of the molten solder, thereby concentrating Bi and Pb in the liquid phase. Subsequently, when the temperature of the molten solder further decreases, a low melting-point crystalline phase in which the amounts of Bi and Pb are high becomes segregated. Therefore, the mechanical strength of the solder alloy is deteriorated and the reliability is deteriorated. In particular, since the crystalline phase in which the concentration of Bi is high is hard and fragile, the reliability is significantly deteriorated when the crystalline phase is segregated in the solder alloy.

From such a viewpoint, in the case where the solder alloy according to the present invention contains Bi, the upper limit of the Bi amount is 10000 ppm or less, preferably 5000 ppm or less, more preferably 1000 ppm or less, and even more preferably 300 ppm or less. In the case where the solder alloy according to the present invention contains Pb, the upper limit of the Pb amount is 5100 ppm or less, preferably 5000 ppm or less, more preferably 1000 ppm or less, even more preferably 500 ppm or less, particularly preferably 350 ppm or less, and most preferably 300 ppm or less.

(3) Formula (1)

The solder alloy according to the present invention is required to satisfy the following formula (1).

$$300 \leq 3As+Sb+Bi+Pb \qquad (1)$$

In the formula (1), As, Sb, Bi and Pb each represents the amount thereof (ppm) in the alloy constitution.

As, Sb, Bi, and Pb are elements that exhibit the viscosity-increase suppression effect. The value calculated by the formula (1) must be 300 or more. In the case where at least one selected from the group consisting of Sb, Bi and Pb is contained, the amount of As is lower than the amounts of these elements, and the viscosity-increase suppression effect exhibited by As is larger than that exhibited by Sb, Bi or Pb, and therefore the As amount is set to be tripled in the formula (1).

In the case where the value calculated by the formula (1) is less than 300, the viscosity-increase suppression effect is not sufficiently exerted. The lower limit of the value calculated by the formula (1) is 300 or more, preferably 318 or more, more preferably 360 or more, even more preferably 392 or more, particularly preferably 464 or more, and most preferably 714 or more. In contrast, although the upper limit of the value calculated by the formula (1) is not particularly limited in terms of the viscosity-increase suppression effect, the upper limit is preferably 18214 or less, more preferably 15130 or less, even more preferably 11030 or less, and particularly preferably 6214 or less, from the viewpoint of providing an appropriate range of the ΔT.

Since the upper limit of the As amount is less than 40 ppm, the solder alloy according to the present invention contains at least one selected from the group consisting of Sb, Bi and Pb in a total amount of more than 180 ppm. Thus, although the As amount is small according to the present invention, the amounts of Sb, Bi and Pb are set to be high, and the viscosity-increase suppression effect is sufficiently exerted. The absence of all of Sb, Bi and Pb results in an immediate increase in the viscosity of the solder paste.

Among the above-mentioned preferable embodiments, the upper limit is appropriately selected as shown in the following formula (1a).

$$300 \le 3As+Sb+Bi+Pb \le 18214 \quad (1a)$$

In the formula (1a), As, Sb, Bi and Pb each represents the amount thereof (ppm) in the alloy constitution.

(4) Formula (2))

The solder alloy according to the present invention is required to satisfy the following formula (2).

$$0.1 \le \{(3As+Sb)/(Bi+Pb)\} \times 100 \le 200 \quad (2)$$

In the formula (2), As, Sb, Bi and Pb each represents the amount thereof (ppm) in the alloy constitution.

In the case where the amounts of As and Sb are high, the wettability of the solder alloy deteriorates. In contrast, although Bi and Pb suppress deterioration of the wettability due to the inclusion of As, strict control is required because the $\Delta T$ is increased when the amounts thereof are excessively high. In particular, the alloy constitution containing both Bi and Pb tends to increase the $\Delta T$. That is, the $\Delta T$ is increased by increasing the amounts of Bi and Pb to excessively improve the wettability. In contrast, the wettability is deteriorated by increasing the amounts of As and Sb to improve the viscosity-increase suppression effect. In the present invention, a group composed of As and Sb and a group composed of Bi and Pb are separated from each other, and in the case where the total amount of the amounts of both of the groups falls within an appropriately predetermined range, all of the viscosity-increase suppression effect, the narrowing in $\Delta T$, and the wettability are satisfied simultaneously.

In the case where the value calculated by the formula (2) is less than 0.1, the total amount of Bi and Pb is higher than that of As and Sb, thereby enlarging the $\Delta T$. The lower limit of the value calculated by the formula (2) is 0.1 or more, preferably 0.2 or more, more preferably 0.3 or more, even more preferably 0.5 or more, particularly preferably 0.8 or more, and most preferably 10.3 or more. In contrast, when the value calculated by the formula (2) exceeds 200, the total amount of As and Sb is higher than that of Bi and Pb, thereby deteriorating the wettability. The upper limit of the value calculated by the formula (2) is 200 or less, preferably 192.7 or less, more preferably 158.5 or less, even more preferably 143.9 or less, even more preferably 102.0 or less, and particularly preferably 96.0 or less.

The denominator of the formula (2) is "Bi+Pb," and unless these are included, the formula (2) is not satisfied. That is, the solder alloys according to the present invention contain at least one selected from the group consisting of Bi and Pb. An alloy constitution free from both Bi and Pb deteriorates the wettability as mentioned above.

Among the above-mentioned preferable embodiments, the upper limit is appropriately selected as shown in the following formula (2a).

$$0.1 \le \{(3As+Sb)/(Bi+Pb)\} \times 100 \le 158.5 \quad (2a)$$

In the formula (2a), As, Sb, Bi and Pb each represents an amount thereof (ppm by mass) in the alloy constitution.

(5) 0 ppm to 600 ppm of Ni and 0 ppm to 100 ppm of Fe

Fe and Ni are arbitrary elements that can inhibit the growth of intermetallic compounds. In the case where the solder alloy according to the present invention joins a Cu electrode or contains Cu as described below, a $Cu_6Sn_5$ layer formed at the junction interface is made into a $(Cu, Ni)_6Sn_5$ layer, thereby reducing the film thickness of the intermetallic compound layer. In addition, Fe promotes the production of crystalline nuclei during solidification of a molten solder and can suppress the growth of an intermetallic compound phase such as $Cu_6Sn_5$, $Cu_3Sn$, or $Ag_3Sn$.

In the case where the amounts of these elements are within predetermined ranges, the liquidus-line temperature is not excessively increased, the $\Delta T$ falls within an acceptable range and high mechanical properties can be maintained. In the case where the solder alloy according to the present invention contains Ni, the upper limit of the amount of Ni is preferably 600 ppm or less, more preferably 500 ppm or less, even more preferably 100 ppm or less, and particularly preferably 50 ppm or less. In the case where the solder alloy according to the present invention contains Fe, the upper limit of the amount of Fe is preferably 100 ppm or less, more preferably 80 ppm or less, and even more preferably 50 ppm or less.

Although the lower limits of the amounts of Ni and Fe are not particularly limited, the lower limit of the amount of Ni is preferably 10 ppm or more and more preferably 40 ppm or more, since the effect of suppressing the growth of the intermetallic compound is sufficiently exerted. The lower limit of the amount of Fe is preferably 10 ppm or more and more preferably 20 ppm or more.

(6) 0 ppm to 1,200 ppm of In

In is a solid solution-strengthening element of Sn and therefore is an arbitrary element that contributes to sustention of high mechanical properties. In the case where the amount of In is within a predetermined range, the $\Delta T$ falls within an acceptable range and high mechanical properties can be maintained. In the case where the solder alloy according to the present invention contains In, the upper limit of the amount of In is preferably 1,200 ppm or less and more preferably 100 ppm or less. Although the lower limit of the amount of In is not particularly limited, the lower limit of the amount of In is preferably 20 ppm or more, more preferably 30 ppm or more, and even more preferably 50 ppm or more, in order to form a solid solution sufficiently.

(7) At Least Two Selected from the Group Consisting of 0 ppm to 600 ppm of Ni, 0 ppm to 100 ppm of Fe, and 0 ppm to 1200 ppm by Mass of In In the case where each amount of Ni, Fe, and In falls within a predetermined range, the $\Delta T$ easily falls within a predetermined range, and high mechanical properties can be maintained. In the present invention, at least two of these may be included within predetermined ranges, and all three may be included simultaneously.

(8) 0 ppm to 600 ppm of Ni, 0 ppm to 100 ppm of Fe, and Formula (3)

It is preferable that the solder alloy according to the present invention contain predetermined amounts of Ni and Fe that satisfy the following formula (3).

$$0 \le Ni/Fe \le 50 \quad (3)$$

In the formula (3), Ni and Fe each represents the amount thereof (ppm) in the alloy constitution.

Although Fe and Ni contribute to suppression of the growth of the intermetallic compound, Ni contributes to suppression of the growth of an intermetallic compound layer at the junction interface and Fe contributes to suppression of the growth of an intermetallic compound phase in the solder alloy. It is desirable that the amounts of the both elements be somewhat balanced in order to suppress the growth of intermetallic compounds as a whole in a solder joint. The solder alloy according to the present invention preferably satisfies the formula (3) while containing predetermined amounts of Ni and Fe. In order to achieve such an effect, the lower limit of the value calculated by the formula (3) is preferably 0 or more, more preferably 0.1 or more, even more preferably 2 or more, and particularly preferably 7.5 or more. The upper limit of the value calculated by the formula (3) is preferably 50 or less, more preferably 10 or less, and even more preferably 8.0 or less.

It is preferable that the solder alloy according to the present invention furthermore satisfy the following formula (4) in order to suppress the growth of the intermetallic compound, to suppress an excessive increase in the liquidus-line temperature to make the ΔT fall within a permissible range, and to maintain high mechanical properties.

$$0 \leq Ni+Fe \leq 680 \quad (4)$$

In the formula (4), Ni and Fe each represents the amount thereof (ppm) in the alloy constitution.

The lower limit of the value calculated by the formula (4) is preferably 0 or more, more preferably 20 or more, even more preferably 40 or more, particularly preferably 50 or more, and most preferably 60 or more, so as to suppress the growth of intermetallic compounds. The upper limit of the value calculated by the formula (4) is preferably 680 or less, more preferably 500 or less, even more preferably 200 or less, particularly preferably 150 or less, and most preferably 110 or less, so as to prevent the liquidus-line temperature from excessively rising.

(9) At Least One Selected from the Group Consisting of 0% to 4% of Ag and 0% to 0.9% of Cu Ag is an arbitrary element that contributes to formation of $Ag_3Sn$ at the crystalline interface to improve the mechanical strength of the solder alloy. Ag is a noble element relative to Sn in terms of an ionization tendency thereof, and the presence of Ag together with As, Sb, Pb and Bi enhances the viscosity-increase suppression effect thereof. The lower limit of the amount of Ag is preferably 0% or more, more preferably 0.5% or more, and even more preferably 1.0% or more. The upper limit of the amount of Ag is preferably 4% or less, more preferably 3.5% or less, and even more preferably 3.0% or less.

Cu is an arbitrary element that contributes to improvement of the bonding strength of a solder joint. In addition, Cu is a noble element relative to Sn in terms of an ionization tendency thereof, and the presence of Cu together with As, Pb and Bi enhances the viscosity-increase suppression effect thereof. The lower limit of the amount of Cu is preferably 0% or more, more preferably 0.1% or more, and even more preferably 0.2% or more. The upper limit of the amount of Cu is preferably 0.9% or less, more preferably 0.8% or less, and even more preferably 0.7% or less.

(10) Remaining Amount of Sn The remainder of the solder alloy according to the present invention is Sn. In addition to the aforementioned elements, unavoidable impurities may also be included. The inclusion of the unavoidable impurities does not affect the aforementioned effects.

2. Solder Powder

The solder powder according to the present invention is used in a solder paste described below and is preferably a spherical powder. In the case of a spherical powder, the mobility of the solder alloy is improved. It is preferable that the solder powder according to the present invention have a size (particle size distribution) that satisfies symbols 1 to 8 in the classification of powder sizes (Table 2) in JIS Z 3284-1:2014, more preferably have a size (particle size distribution) that satisfies symbols 4 to 8, and even more preferably have a size (particle size distribution) that satisfies symbols 5 to 8. In the case where the particle size satisfies this condition, the surface area of the powder is not excessively large, thereby suppressing the increase in the viscosity and the agglomeration of the fine powder, and thereby suppressing the increase in the viscosity. Thus, soldering to finer components can be conducted.

The solder powder sphericity is preferably 0.90 or more, more preferably 0.95 or more, and most preferably 0.99 or more. In the present invention, the sphericity of the spherical powder is measured using a CNC imaging system (Ultra Quick Vision ULTRA QV350-PRO measuring device manufactured by Mitutoyo Corporation) using the minimum zone circle method (MZC method). In the present invention, the sphericity represents the difference from a perfect sphere, and is the arithmetic mean value calculated by dividing, for example, the diameter of each of 500 balls by the long diameter thereof, and the value closer to the upper limit of 1.00 means that the shape is closer to a perfect sphere.

3. Solder Paste

A solder paste contains the above-mentioned solder powder and a flux.

(1) Flux Component

A flux used in the solder paste may be any of organic acids, amines, amine halogenated hydroacid salts, organohalogen compounds, thixo agents, rosins, solvents, surfactants, base agents, polymeric compounds, silane coupling agents, and colorants, or a combination of at least two thereof.

Examples of the organic acids include succinic acid, glutaric acid, adipic acid, pimelic acid, suberic acid, azelaic acid, sebacic acid, dimeric acid, propionic acid, 2,2-bishydroxymethylpropionic acid, tartaric acid, malic acid, glycolic acid, diglycolic acid, thioglycolic acid, dithioglycolic acid, stearic acid, 12-hydroxystearic acid, palmitic acid, and oleic acid. In the case where the solder powder contains In, succinic acid, adipic acid, or azelaic acid may be selected as the organic acid, as needed.

Examples of the amines include ethylamine, triethylamine, ethylenediamine, triethylenetetramine, 2-methylimidazole, 2-undecylimidazole, 2-heptadecylimidazole, 1, 2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazoliumchloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzoimidazole, 2-octylbenzoimidazole, 2-pentylbenzoimidazole, 2-(1-ethylpentyl)benzoimidazole, 2-nonylbenzoimidazole, 2-(4-thiazolyl)benzoimidazole, benzoimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl]methylbenzotriazole, 2,2'-[[(methyl-1H-benzotriazol-1-yl)methyl]imino]bisethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole, and 5-phenyltetrazole.

The amine halogenated hydroacid salt is a compound formed by reacting an amine and a halogen halide. Examples of the amine include ethylamine, ethylenediamine, triethylamine, diphenylguanidine, ditolylguanidine, methylimidazole, and 2-ethyl-4-methylimidazole. Examples of the halogen halide include hydrides of chlorine, bromine, and iodine.

Examples of the organohalogen compounds include trans-2,3-dibromo-2-butene-1,4-diol, triallylisocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, and 2,3-dibromo-2-butene-1,4-diol.

Examples of the thixo agents include wax-based thixo agents, amide-based thixo agents, and sorbitol-based thixo agents. Examples of the wax-based thixo agents include hardened castor oil. Examples of the amide-based thixo agents include monoamide-based thixo agents, bisamide-based thixo agents, and polyamide-based thixo agents, and specific examples thereof include lauramide, palmitamide, stearamide, behenamide, hydroxystearamide, saturated fatty acid amide, oleamide, erucamide, unsaturated fatty acid amide, p-toluene methane amide, aromatic amide, methylenebisstearamide, ethylenebislauramide, ethylenebishydroxystearamide, saturated fatty acid bisamide, methylenebisoleamide, unsaturated fatty acid bisamide, m-xylylenebisstearamide, aromatic bisamide, saturated fatty acid polyamide, unsaturated fatty acid polyamide, aromatic polyamide, substituted amide, methylolstearamide, methylolamide, and fatty acid ester amide. Examples of the sorbitol-based thixo agents include dibenzylidene-D-sorbitol, and bis(4-methylbenzylidene)-D-sorbitol.

Examples of the base agents include nonionic surfactants, weak cationic surfactants, and rosins.

Examples of the nonionic surfactants include polyethylene glycol, polyethylene glycol—polypropylene glycol copolymers, aliphatic alcohol polyoxyethylene adducts, aromatic alcohol polyoxyethylene adducts, and polyhydric alcohol polyoxyethylene adducts.

Examples of the weak cationic surfactants include diamine-terminated polyethylene glycol, diamine-terminated polyethylene glycol—polypropylene glycol copolymers, aliphatic amine polyoxyethylene adducts, aromatic amine polyoxyethylene adducts, and polyhydric amine polyoxyethylene adducts.

Examples of the rosins include: raw material rosins, such as gum rosins, wood rosins and tall oil rosins; and derivatives obtained from the raw material rosins. Examples of the derivatives include: purified rosin; hydrogenated rosin; heterogeneous rosin; polymerized rosin; α, β unsaturated carboxylic acid-modified products (such as acrylated rosin, maleated rosin, and fumarated rosin); purified products, hydrogenated products and heterogeneous products of the polymerized rosins; and purified products, hydrogenated products and heterogeneous products of the α, β unsaturated carboxylic acid-modified products, and at least two thereof may be used. In addition to the rosin-based resin, at least one resin selected from the group consisting of terpene resin, modified terpene resin, terpenephenol resin, modified terpenephenol resin, styrene resin, modified styrene resin, xylene resin, and modified xylene resin may further be contained. Examples of the modified terpene resin to be used include aromatic modified terpene resin, hydrogenated terpene resin, and hydrogenated aromatic modified terpene resin. Examples of the modified terpenephenol resin to be used include hydrogenated terpenephenol resin. Examples of the modified styrene resin to be used include styrene acrylic resin, and styrene maleic acid resin. Examples of the modified xylene resin include phenol modified xylene resin, alkylphenol modified xylene resin, phenol modified resole-type xylene resin, polyol modified xylene resin, and polyoxyethylene-added xylene resin.

Examples of the solvent include water, alcohol-based solvents, glycol ether-based solvents, and terpineols. Examples of the alcohol-based solvents include isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethypethyl]ether, 1-ethynyl-1-cyclohexanol, 1,4-cyclohexanediol, 1,4-cyclohexanedimethanol, erythritol, threitol, glyceryl guaiacolate, 3,6-dimethyl-4-octyne-3,6-diol, and 2,4,7,9-tetramethyl-5-decyne-4,7-diol. Examples of the glycol ether-based solvent include diethylene glycol mono-2-ethylhexyl ether, ethylene glycol monophenyl ether, 2-methylpentane-2,4-diol, diethylene glycol monohexyl ether, diethylene glycol dibutyl ether, and triethylene glycol monobutyl ether.

Examples of the surfactant include polyoxyalkylene acetylene glycols, polyoxyalkylene glyceryl ethers, polyoxyalkylene alkyl ethers, polyoxyalkylene esters, polyoxyalkylene alkylamines, and polyoxyalkylene alkylamides.

(2) Amount of Flux

The amount of a flux, relative to the total mass of the solder paste, is preferably 5% to 95%, and more preferably 5% to 15%. In the case where the amount of a flux is within the above-mentioned range, the viscosity-increase suppression effect due to the solder powder is sufficiently exerted.

(3) Preparation Method of Solder Paste

A solder paste according to the present invention is prepared by a method common in the art. A solder powder may be prepared by a conventionally-known method, such as a falling-drop method in which molten solder raw materials are allowed to fall in drops to obtain particles; a spraying method in which molten solder raw materials are sprayed by centrifugation; or a method in which a bulk solder raw material is pulverized. In the falling-drop method or the spraying method, the falling-drop or spraying process is preferably conducted in an inert atmosphere or a solvent to conduct granulation. The above-mentioned components are mixed while heating to prepare a flux, and the above-mentioned solder powder is added to the flux, followed by conducting stirring and mixing for preparation.

4. Solder Joint

A solder joint according to the present invention is suitable to connect IC chips in semiconductor packages with substrates (interposers) thereof or to connect semiconductor packages with printed wiring boards. Here, the term "solder joint" refers to a connection part of an electrode.

5. Others

The solder alloy according to the present invention may be wire-like in addition to being used as a solder powder as mentioned above.

The method of preparing the solder joint according to the present invention may be conducted by a conventional method.

The joining method using the solder paste according to the present invention may be conducted by a conventional method, such as a reflow method. In the case of flow soldering, the melting temperature of the solder alloy may be approximately 20° C. higher than the liquidus-line temperature. In the case where the solder alloy according to the present invention is used to conduct bonding, it is preferable from the viewpoint of miniaturization of a structure to take into account the cooling rate during solidification. For example, the solder joint is cooled at a cooling rate of 2° C./s to 3° C./s or higher. Other joining conditions may be suitably adjusted depending on the alloy constitution of the solder alloy.

The solder alloy according to the present invention may be made as a low α dose alloy by using a low α dose material as a raw material thereof. The use of such a low α dose alloy in the formation of a solder bump around memory makes it possible to suppress soft errors.

EXAMPLES

Although the present invention will be described with reference to the following examples, the present invention is not limited to the following examples.

A flux prepared from 42 parts by mass of a rosin, 35 parts by mass of a glycol-based solvent, 8 parts by mass of a thixo agent, 10 parts by mass of an organic acid, 2 parts by mass of an amine, and 3 parts by mass of a halogen, and a solder powder having each alloy constitution shown in Table 1 to Table 22 and a size (particle size distribution) that satisfies symbol 4 in the classification of powder sizes (Table 2) in JIS Z 3284-1:2014 were mixed to prepare a solder paste. The mass ratio of the flux and the solder powder, flux:solder powder, was 11:89. The change in viscosity of each solder paste over time was measured. In addition, the liquidus-line temperature and the solidus temperature of the solder powder were measured. In addition, the wettability was evaluated using the solder paste immediately after preparation. The details are shown below.

Change Over Time

Each solder paste immediately after preparation was subjected to measurement of the viscosity using a viscometer manufactured by Malcom Co., Ltd., under the trade name of PCU-25 at a rotation speed of 10 rpm at 25° C. in the atmosphere for 12 hours. The case where the viscosity after 12 hours was 1.2 times or lower than that after 30 minutes passed from the preparation was evaluated as "○" indicating that a sufficient viscosity-increase suppression effect was exhibited, whilst the case where the viscosity after 12 hours exceeded 1.2 times than that after 30 minutes passed from the preparation was evaluated as "x".

ΔT

The solder powder before mixing with the flux was subjected to DSC measurement using DSC manufactured by SII NanoTechnology Inc., under the model number of EXSTAR DSC 7020, at a sample amount of approximately 30 mg and a temperature rise rate of 15° C./min to determine the solidus temperature and the liquidus-line temperature. The resultant solidus temperature was subtracted from the resultant liquidus-line temperature to determine ΔT. The case where ΔT was 10° C. or less was evaluated as "○", whilst the case where ΔT exceeded 10° C. was evaluated as "x".

Wettability

Each solder paste immediately after preparation was printed on a Cu plate, heated at a temperature rise rate of 1° C./s from 25° C. to 260° C. in an $N_2$ atmosphere in a reflow furnace, followed by cooling the resultant to room temperature. The wettability was evaluated by observing the appearance of solder bumps after cooling under a light microscope. The case where unmelted solder powder was not observed was evaluated as "○", whilst the case where unmelted solder powder was observed was evaluated as "x".

Total Evaluation

The case where the resultant was evaluated as "○" in all of the above-mentioned tests was evaluated as "○", whilst the case where the resultant was evaluated as "x" in at least one test was evaluated as "x".

The evaluation results are shown in Tables 1 to 22.

TABLE 1

| | Alloy constitution | | | | | | | | | | | | | | Evaluation item | | | |
|---|---|---|---|---|---|---|---|---|---|---|---|---|---|---|---|---|---|---|
| | | | | (As, Bi, Pb, Sb: ppm by mass, Ag, Cu: % by mass) | | | | | | | Formula (1) | Formula (2) | Formula (3) | Formula (4) | Change over time | ΔT | Wetta-bility | Total evalu-ation |
| | Sn | Ag | Cu | As | Bi | Pb | Sb | Ni | Fe | In | | | | | | | | |
| Ex. 1 | Bal. | | | 18 | 82 | 82 | 82 | | | | 300 | 82.9 | — | 0 | ○ | ○ | ○ | ○ |
| Ex. 2 | Bal. | | | 18 | 50 | 150 | 150 | | | | 404 | 102.0 | — | 0 | ○ | ○ | ○ | ○ |
| Ex. 3 | Bal. | | | 18 | 150 | 300 | 50 | | | | 554 | 23.1 | — | 0 | ○ | ○ | ○ | ○ |
| Ex. 4 | Bal. | | | 18 | 150 | 50 | 150 | | | | 404 | 102.0 | — | 0 | ○ | ○ | ○ | ○ |
| Ex. 5 | Bal. | | | 18 | 123 | 0 | 123 | | | | 300 | 143.8 | — | 0 | ○ | ○ | ○ | ○ |
| Ex. 6 | Bal. | | | 18 | 0 | 123 | 123 | | | | 300 | 143.8 | — | 0 | ○ | ○ | ○ | ○ |
| Ex. 7 | Bal. | | | 18 | 150 | 300 | 150 | | | | 654 | 45.3 | — | 0 | ○ | ○ | ○ | ○ |
| Ex. 8 | Bal. | | | 18 | 300 | 300 | 300 | | | | 954 | 59.0 | — | 0 | ○ | ○ | ○ | ○ |
| Ex. 9 | Bal. | | | 18 | 300 | 1000 | 1000 | | | | 2354 | 81.1 | — | 0 | ○ | ○ | ○ | ○ |
| Ex. 10 | Bal. | | | 18 | 1000 | 300 | 1000 | | | | 2354 | 81.1 | — | 0 | ○ | ○ | ○ | ○ |
| Ex. 11 | Bal. | | | 18 | 1000 | 1000 | 1000 | | | | 3054 | 32.7 | — | 0 | ○ | ○ | ○ | ○ |
| Ex. 12 | Bal. | | | 10 | 10000 | 5100 | 3000 | | | | 18130 | 20.1 | — | 0 | ○ | ○ | ○ | ○ |
| R. Ex. 13 | Bal. | | | 10 | 10000 | 5100 | 0 | | | | 15130 | 0.2 | — | 0 | ○ | ○ | ○ | ○ |
| Ex. 14 | Bal. | | | 10 | 10000 | 0 | 1000 | | | | 11030 | 10.3 | — | 0 | ○ | ○ | ○ | ○ |
| Ex. 15 | Bal. | | | 10 | 0 | 5100 | 1000 | | | | 6130 | 20.2 | — | 0 | ○ | ○ | ○ | ○ |
| Ex. 16 | Bal. | | | 10 | 150 | 300 | 150 | | | | 630 | 40.0 | — | 0 | ○ | ○ | ○ | ○ |
| Ex. 17 | Bal. | | | 14 | 86 | 86 | 86 | | | | 300 | 74.4 | — | 0 | ○ | ○ | ○ | ○ |

TABLE 1-continued

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evalu-ation |
| Ex. 18 | Bal. | | | 14 | 50 | 150 | 150 | | | | 392 | 96.0 | — | 0 | ○ | ○ | ○ | ○ |
| Ex. 19 | Bal. | | | 14 | 150 | 300 | 50 | | | | 542 | 20.4 | — | 0 | ○ | ○ | ○ | ○ |
| Ex. 20 | Bal. | | | 14 | 150 | 50 | 150 | | | | 392 | 96.0 | — | 0 | ○ | ○ | ○ | ○ |
| Ex. 21 | Bal. | | | 14 | 200 | 0 | 200 | | | | 442 | 121.0 | — | 0 | ○ | ○ | ○ | ○ |
| Ex. 22 | Bal. | | | 14 | 0 | 200 | 200 | | | | 442 | 121.0 | — | 0 | ○ | ○ | ○ | ○ |
| Ex. 23 | Bal. | | | 14 | 150 | 300 | 150 | | | | 642 | 42.7 | — | 0 | ○ | ○ | ○ | ○ |
| Ex. 24 | Bal. | | | 14 | 300 | 300 | 300 | | | | 942 | 57.0 | — | 0 | ○ | ○ | ○ | ○ |
| Ex. 25 | Bal. | | | 14 | 300 | 1000 | 1000 | | | | 2342 | 80.2 | — | 0 | ○ | ○ | ○ | ○ |
| Ex. 26 | Bal. | | | 14 | 1000 | 300 | 1000 | | | | 2342 | 80.2 | — | 0 | ○ | ○ | ○ | ○ |
| Ex. 27 | Bal. | | | 14 | 1000 | 1000 | 1000 | | | | 3042 | 52.1 | — | 0 | ○ | ○ | ○ | ○ |

(Ex.: Example, R. Ex: Referential Example)

TABLE 2

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evalu-ation |
| Ex. 28 | Bal. | | | 14 | 10000 | 5100 | 3000 | | | | 18142 | 20.1 | — | 0 | ○ | ○ | ○ | ○ |
| R. Ex. 29 | Bal. | | | 14 | 10000 | 5100 | 0 | | | | 15142 | 0.3 | — | 0 | ○ | ○ | ○ | ○ |
| Ex. 30 | Bal. | | | 14 | 10000 | 0 | 1000 | | | | 11042 | 10.4 | — | 0 | ○ | ○ | ○ | ○ |
| Ex. 31 | Bal. | | | 14 | 0 | 5100 | 1000 | | | | 6142 | 20.4 | — | 0 | ○ | ○ | ○ | ○ |
| Ex. 32 | Bal. | | | 14 | 150 | 300 | 150 | | | | 642 | 42.7 | — | 0 | ○ | ○ | ○ | ○ |
| Ex. 33 | Bal. | | | 24 | 82 | 82 | 82 | | | | 318 | 93.9 | — | 0 | ○ | ○ | ○ | ○ |
| Ex. 34 | Bal. | | | 24 | 50 | 150 | 150 | | | | 422 | 111.0 | — | 0 | ○ | ○ | ○ | ○ |
| Ex. 35 | Bal. | | | 24 | 150 | 300 | 50 | | | | 572 | 27.1 | — | 0 | ○ | ○ | ○ | ○ |
| Ex. 36 | Bal. | | | 24 | 150 | 50 | 150 | | | | 422 | 111.0 | — | 0 | ○ | ○ | ○ | ○ |
| Ex. 37 | Bal. | | | 24 | 123 | 0 | 123 | | | | 318 | 158.5 | — | 0 | ○ | ○ | ○ | ○ |
| Ex. 38 | Bal. | | | 24 | 0 | 123 | 123 | | | | 318 | 158.5 | — | 0 | ○ | ○ | ○ | ○ |
| Ex. 39 | Bal. | | | 24 | 150 | 300 | 150 | | | | 672 | 49.3 | — | 0 | ○ | ○ | ○ | ○ |
| Ex. 40 | Bal. | | | 24 | 300 | 300 | 300 | | | | 972 | 82.0 | — | 0 | ○ | ○ | ○ | ○ |
| Ex. 41 | Bal. | | | 24 | 300 | 1000 | 1000 | | | | 2372 | 82.5 | — | 0 | ○ | ○ | ○ | ○ |
| Ex. 42 | Bal. | | | 24 | 1000 | 300 | 1000 | | | | 2372 | 82.5 | — | 0 | ○ | ○ | ○ | ○ |
| Ex. 43 | Bal. | | | 24 | 1000 | 1000 | 1000 | | | | 3072 | 53.6 | — | 0 | ○ | ○ | ○ | ○ |
| Ex. 44 | Bal. | | | 24 | 10000 | 5100 | 3000 | | | | 18172 | 20.3 | — | 0 | ○ | ○ | ○ | ○ |
| R. Ex. 45 | Bal. | | | 24 | 10000 | 5100 | 0 | | | | 15172 | 0.5 | — | 0 | ○ | ○ | ○ | ○ |
| Ex. 46 | Bal. | | | 24 | 10000 | 0 | 1000 | | | | 11072 | 10.7 | — | 0 | ○ | ○ | ○ | ○ |
| Ex. 47 | Bal. | | | 24 | 0 | 5100 | 1000 | | | | 6172 | 21.0 | — | 0 | ○ | ○ | ○ | ○ |
| Ex. 48 | Bal. | | | 24 | 150 | 300 | 150 | | | | 672 | 49.3 | — | 0 | ○ | ○ | ○ | ○ |
| R. Ex. 49 | Bal. | | | 38 | 82 | 82 | 82 | | | | 360 | 119.5 | — | 0 | ○ | ○ | ○ | ○ |
| R. Ex. 50 | Bal. | | | 38 | 50 | 150 | 150 | | | | 464 | 132.0 | — | 0 | ○ | ○ | ○ | ○ |
| R. Ex. 51 | Bal. | | | 38 | 150 | 300 | 50 | | | | 614 | 58.4 | — | 0 | ○ | ○ | ○ | ○ |
| R. Ex. 52 | Bal. | | | 38 | 150 | 50 | 150 | | | | 484 | 132.0 | — | 0 | ○ | ○ | ○ | ○ |
| R. Ex. 53 | Bal. | | | 38 | 123 | 0 | 123 | | | | 360 | 192.7 | — | 0 | ○ | ○ | ○ | ○ |
| R. Ex. 54 | Bal. | | | 38 | 0 | 123 | 123 | | | | 360 | 192.7 | — | 0 | ○ | ○ | ○ | ○ |

(Ex.: Example, R. Ex: Referential Example)

TABLE 3

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evalu-ation |
| R. Ex. 55 | Bal. | | | 38 | 150 | 300 | 150 | | | | 714 | 58.7 | — | 0 | ○ | ○ | ○ | ○ |
| R. Ex. 56 | Bal. | | | 38 | 300 | 300 | 300 | | | | 1014 | 69.0 | — | 0 | ○ | ○ | ○ | ○ |
| R. Ex. 57 | Bal. | | | 38 | 300 | 1000 | 1000 | | | | 2414 | 85.7 | — | 0 | ○ | ○ | ○ | ○ |
| R. Ex. 58 | Bal. | | | 38 | 1000 | 300 | 1000 | | | | 2414 | 85.7 | — | 0 | ○ | ○ | ○ | ○ |
| R. Ex. 59 | Bal. | | | 38 | 1000 | 1000 | 1000 | | | | 3114 | 55.7 | — | 0 | ○ | ○ | ○ | ○ |
| R. Ex. 60 | Bal. | | | 38 | 10000 | 5100 | 3000 | | | | 18214 | 20.6 | — | 0 | ○ | ○ | ○ | ○ |
| R. Ex. 61 | Bal. | | | 38 | 10000 | 5100 | 0 | | | | 15214 | 0.8 | — | 0 | ○ | ○ | ○ | ○ |

TABLE 3-continued

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evalu-ation |
| R. Ex. 62 | Bal. | | | 38 | 10000 | 0 | 1000 | | | | 1114 | 11.1 | — | 0 | ○ | ○ | ○ | ○ |
| R. Ex. 63 | Bal. | | | 38 | 0 | 5100 | 1000 | | | | 6214 | 21.8 | — | 0 | ○ | ○ | ○ | ○ |
| R. Ex. 64 | Bal. | | | 38 | 150 | 300 | 150 | | | | 714 | 58.7 | — | 0 | ○ | ○ | ○ | ○ |
| Ex. 65 | Bal. | | | 18 | 150 | 300 | 150 | 40 | | | 654 | 45.3 | — | 40 | ○ | ○ | ○ | ○ |
| Ex. 66 | Bal. | | | 18 | 150 | 300 | 150 | 100 | | | 654 | 45.3 | — | 100 | ○ | ○ | ○ | ○ |
| Ex. 67 | Bal. | | | 18 | 150 | 300 | 150 | 500 | | | 654 | 45.3 | — | 500 | ○ | ○ | ○ | ○ |
| Ex. 68 | Bal. | | | 18 | 150 | 300 | 150 | 600 | | | 654 | 45.3 | — | 800 | ○ | ○ | ○ | ○ |
| Ex. 69 | Bal. | | | 18 | 150 | 300 | 150 | | 20 | | 654 | 45.3 | 0 | 20 | ○ | ○ | ○ | ○ |
| Ex. 70 | Bal. | | | 18 | 150 | 309 | 150 | | 100 | | 654 | 45.3 | 0 | 100 | ○ | ○ | ○ | ○ |
| Ex. 71 | Bal. | | | 18 | 150 | 300 | 150 | 40 | 20 | | 654 | 45.3 | 2 | 60 | ○ | ○ | ○ | ○ |
| Ex. 72 | Bal. | | | 18 | 150 | 300 | 150 | 40 | 10 | | 654 | 45.3 | 4 | 50 | ○ | ○ | ○ | ○ |
| Ex. 73 | Bal. | | | 18 | 150 | 200 | 150 | 80 | 10 | | 654 | 45.3 | 8 | 90 | ○ | ○ | ○ | ○ |
| Ex. 74 | Bal. | | | 18 | 150 | 300 | 150 | 500 | 10 | | 654 | 45.3 | 50 | 510 | ○ | ○ | ○ | ○ |
| Ex. 75 | Bal. | | | 18 | 150 | 300 | 150 | 10 | 100 | | 654 | 45.3 | 0.1 | 110 | ○ | ○ | ○ | ○ |
| Ex. 76 | Bal. | | | 18 | 150 | 300 | 150 | 100 | 100 | | 654 | 45.3 | 1 | 200 | ○ | ○ | ○ | ○ |
| Ex. 77 | Bal. | | | 18 | 150 | 300 | 150 | 800 | 80 | | 654 | 45.3 | 7.5 | 680 | ○ | ○ | ○ | ○ |
| Ex. 78 | Bal. | | | 18 | 150 | 300 | 150 | | | 20 | 654 | 45.3 | — | 0 | ○ | ○ | ○ | ○ |
| Ex. 79 | Bal. | | | 18 | 150 | 300 | 150 | | | 100 | 654 | 45.3 | — | 0 | ○ | ○ | ○ | ○ |
| Ex. 80 | Bal. | | | 18 | 150 | 300 | 150 | | | 1200 | 654 | 45.3 | — | 0 | ○ | ○ | ○ | ○ |
| Ex. 81 | Bal. | | | 18 | 150 | 300 | 150 | 40 | 20 | 20 | 654 | 45.3 | 2 | 80 | ○ | ○ | ○ | ○ |

(Ex.: Example, R. Ex: Referential Example)

TABLE 4

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evalu-ation |
| Ex. 82 | Bal. | | | 18 | 150 | 300 | 150 | 100 | 50 | 50 | 654 | 45.3 | 2 | 150 | ○ | ○ | ○ | ○ |
| Ex. 83 | Bal. | | | 18 | 150 | 300 | 150 | 500 | 50 | 30 | 654 | 45.3 | 10 | 550 | ○ | ○ | ○ | ○ |
| Ex. 84 | Bal. | | 0.7 | 18 | 82 | 82 | 82 | | | | 300 | 82.9 | — | 0 | ○ | ○ | ○ | ○ |
| Ex. 85 | Bal. | | 0.7 | 18 | 50 | 150 | 150 | | | | 404 | 102.0 | — | 0 | ○ | ○ | ○ | ○ |
| Ex. 86 | Bal. | | 0.7 | 18 | 150 | 300 | 50 | | | | 554 | 23.1 | — | 0 | ○ | ○ | ○ | ○ |
| Ex. 87 | Bal. | | 0.7 | 18 | 150 | 50 | 150 | | | | 404 | 102.0 | — | 0 | ○ | ○ | ○ | ○ |
| Ex. 88 | Bal. | | 0.7 | 18 | 123 | 0 | 123 | | | | 300 | 143.9 | — | 0 | ○ | ○ | ○ | ○ |
| Ex. 89 | Bal. | | 0.7 | 18 | 0 | 123 | 123 | | | | 300 | 143.9 | — | 0 | ○ | ○ | ○ | ○ |
| Ex. 90 | Bal. | | 0.7 | 18 | 150 | 300 | 150 | | | | 854 | 45.3 | — | 0 | ○ | ○ | ○ | ○ |
| Ex. 91 | Bal. | | 0.7 | 18 | 300 | 300 | 300 | | | | 954 | 59.0 | — | 0 | ○ | ○ | ○ | ○ |
| Ex. 92 | Bal. | | 0.7 | 18 | 300 | 1000 | 1000 | | | | 2354 | 81.1 | — | 0 | ○ | ○ | ○ | ○ |
| Ex. 93 | Bal. | | 0.7 | 18 | 1000 | 300 | 1000 | | | | 2354 | 81.1 | — | 0 | ○ | ○ | ○ | ○ |
| Ex. 94 | Bal. | | 0.7 | 18 | 1000 | 1000 | 1000 | | | | 3054 | 52.7 | — | 0 | ○ | ○ | ○ | ○ |
| Ex. 95 | Bal. | | 0.7 | 10 | 10000 | 5100 | 3000 | | | | 18130 | 20.1 | — | 0 | ○ | ○ | ○ | ○ |
| R. Ex. 96 | Bal. | | 0.7 | 10 | 10000 | 5100 | 0 | | | | 15130 | 0.2 | — | 0 | ○ | ○ | ○ | ○ |
| Ex. 97 | Bal. | | 0.7 | 10 | 10000 | 0 | 1000 | | | | 11030 | 10.3 | — | 0 | ○ | ○ | ○ | ○ |
| Ex. 98 | Bal. | | 0.7 | 10 | 0 | 5100 | 1000 | | | | 8130 | 20.2 | — | 0 | ○ | ○ | ○ | ○ |
| Ex. 99 | Bal. | | 0.7 | 10 | 150 | 300 | 150 | | | | 830 | 40.0 | — | 0 | ○ | ○ | ○ | ○ |
| Ex. 100 | Bal. | | 0.7 | 14 | 86 | 86 | 86 | | | | 300 | 74.4 | — | 0 | ○ | ○ | ○ | ○ |
| Ex. 101 | Bal. | | 0.7 | 14 | 50 | 150 | 150 | | | | 392 | 96.0 | — | 0 | ○ | ○ | ○ | ○ |
| Ex. 102 | Bal. | | 0.7 | 14 | 150 | 300 | 50 | | | | 542 | 20.4 | — | 0 | ○ | ○ | ○ | ○ |
| Ex. 103 | Bal. | | 0.7 | 14 | 150 | 50 | 150 | | | | 392 | 96.0 | — | 0 | ○ | ○ | ○ | ○ |
| Ex. 104 | Bal. | | 0.7 | 14 | 200 | 0 | 200 | | | | 442 | 121.0 | — | 0 | ○ | ○ | ○ | ○ |
| Ex. 105 | Bal. | | 0.7 | 14 | 0 | 200 | 200 | | | | 442 | 121.0 | — | 0 | ○ | ○ | ○ | ○ |
| Ex. 106 | Bal. | | 0.7 | 14 | 150 | 300 | 150 | | | | 842 | 42.7 | — | 0 | ○ | ○ | ○ | ○ |
| Ex. 107 | Bal. | | 0.7 | 14 | 300 | 300 | 300 | | | | 842 | 57.0 | — | 0 | ○ | ○ | ○ | ○ |
| Ex. 108 | Bal. | | 0.7 | 14 | 300 | 1000 | 1000 | | | | 2342 | 80.2 | — | 0 | ○ | ○ | ○ | ○ |

(Ex.: Example, R. Ex: Referential Example)

TABLE 5

| | Alloy constitution (As, Bi, Pb, Sb: ppm by mass, Ag, Cu: % by mass) | | | | | | | | | Formula (1) | Formula (2) | Formula (3) | Formula (4) | Evaluation item | | | Total evaluation |
|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | |
| Ex. 109 | Bal. | 0.7 | 14 | 1000 | 300 | 1000 | | | | | 2342 | 80.2 | — | 0 | ○ | ○ | ○ | ○ |
| Ex. 110 | Bal. | 0.7 | 14 | 1000 | 1000 | 1000 | | | | | 3042 | 52.1 | — | 0 | ○ | ○ | ○ | ○ |
| Ex. 111 | Bal. | 0.7 | 14 | 10000 | 5100 | 3000 | | | | | 18142 | 20.1 | — | 0 | ○ | ○ | ○ | ○ |
| R. Ex. 112 | Bal. | 0.7 | 14 | 10000 | 5100 | 0 | | | | | 15142 | 0.3 | — | 0 | ○ | ○ | ○ | ○ |
| Ex. 113 | Bal. | 0.7 | 14 | 10000 | 0 | 1000 | | | | | 11042 | 10.4 | — | 0 | ○ | ○ | ○ | ○ |
| Ex. 114 | Bal. | 0.7 | 14 | 0 | 5100 | 1000 | | | | | 6142 | 20.4 | — | 0 | ○ | ○ | ○ | ○ |
| Ex. 115 | Bal. | 0.7 | 14 | 150 | 300 | 150 | | | | | 642 | 42.7 | — | 0 | ○ | ○ | ○ | ○ |
| Ex. 116 | Bal. | 0.7 | 24 | 82 | 82 | 82 | | | | | 318 | 93.9 | — | 0 | ○ | ○ | ○ | ○ |
| Ex. 117 | Bal. | 0.7 | 24 | 50 | 150 | 150 | | | | | 422 | 111.0 | — | 0 | ○ | ○ | ○ | ○ |
| Ex. 118 | Bal. | 0.7 | 24 | 150 | 300 | 50 | | | | | 572 | 27.1 | — | 0 | ○ | ○ | ○ | ○ |
| Ex. 119 | Bal. | 0.7 | 24 | 150 | 50 | 150 | | | | | 422 | 111.0 | — | 0 | ○ | ○ | ○ | ○ |
| Ex. 120 | Bal. | 0.7 | 24 | 123 | 0 | 123 | | | | | 318 | 158.5 | — | 0 | ○ | ○ | ○ | ○ |
| Ex. 121 | Bal. | 0.7 | 24 | 0 | 123 | 123 | | | | | 318 | 158.5 | — | 0 | ○ | ○ | ○ | ○ |
| Ex. 122 | Bal. | 0.7 | 24 | 150 | 300 | 150 | | | | | 672 | 49.3 | — | 0 | ○ | ○ | ○ | ○ |
| Ex. 123 | Bal. | 0.7 | 24 | 300 | 300 | 300 | | | | | 972 | 62.0 | — | 0 | ○ | ○ | ○ | ○ |
| Ex. 124 | Bal. | 0.7 | 24 | 300 | 1000 | 1000 | | | | | 2372 | 82.5 | — | 0 | ○ | ○ | ○ | ○ |
| Ex. 125 | Bal. | 0.7 | 24 | 1000 | 300 | 1000 | | | | | 2372 | 82.5 | — | 0 | ○ | ○ | ○ | ○ |
| Ex. 126 | Bal. | 0.7 | 24 | 1000 | 1000 | 1000 | | | | | 3072 | 53.6 | — | 0 | ○ | ○ | ○ | ○ |
| Ex. 127 | Bal. | 0.7 | 24 | 10000 | 5100 | 3000 | | | | | 18172 | 20.3 | — | 0 | ○ | ○ | ○ | ○ |
| R. Ex. 128 | Bal. | 0.7 | 24 | 10000 | 5100 | 0 | | | | | 15172 | 0.5 | — | 0 | ○ | ○ | ○ | ○ |
| Ex. 129 | Bal. | 0.7 | 24 | 10000 | 0 | 1000 | | | | | 11072 | 10.7 | — | 0 | ○ | ○ | ○ | ○ |
| Ex. 130 | Bal. | 0.7 | 24 | 0 | 5100 | 1000 | | | | | 6172 | 21.0 | — | 0 | ○ | ○ | ○ | ○ |
| Ex. 131 | Bal. | 0.7 | 24 | 150 | 300 | 150 | | | | | 672 | 49.3 | — | 0 | ○ | ○ | ○ | ○ |
| R. Ex. 132 | Bal. | 0.7 | 38 | 82 | 82 | 82 | | | | | 360 | 119.5 | — | 0 | ○ | ○ | ○ | ○ |
| R. Ex. 133 | Bal. | 0.7 | 38 | 50 | 150 | 150 | | | | | 464 | 132.0 | — | 0 | ○ | ○ | ○ | ○ |
| R. Ex. 134 | Bal. | 0.7 | 38 | 150 | 300 | 50 | | | | | 614 | 36.4 | — | 0 | ○ | ○ | ○ | ○ |
| R. Ex. 135 | Bal. | 0.7 | 38 | 150 | 50 | 150 | | | | | 464 | 132.0 | — | 0 | ○ | ○ | ○ | ○ |

(Ex.: Example, R. Ex: Referential Example)

TABLE 6

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | Total evaluation |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | |
| R. Ex. 136 | Bal. | 0.7 | 38 | 123 | 0 | 123 | | | | | 360 | 192.7 | — | 0 | ○ | ○ | ○ | ○ |
| R. Ex. 137 | Bal. | 0.7 | 38 | 0 | 123 | 123 | | | | | 360 | 192.7 | — | 0 | ○ | ○ | ○ | ○ |
| R. Ex. 138 | Bal. | 0.7 | 38 | 150 | 300 | 150 | | | | | 714 | 58.7 | — | 0 | ○ | ○ | ○ | ○ |
| R. Ex. 139 | Bal. | 0.7 | 38 | 300 | 300 | 300 | | | | | 1014 | 69.0 | — | 0 | ○ | ○ | ○ | ○ |
| R. Ex. 140 | Bal. | 0.7 | 38 | 300 | 1000 | 1000 | | | | | 2414 | 85.7 | — | 0 | ○ | ○ | ○ | ○ |
| R. Ex. 141 | Bal. | 0.7 | 38 | 1000 | 300 | 1000 | | | | | 2414 | 85.7 | — | 0 | ○ | ○ | ○ | ○ |
| R. Ex. 142 | Bal. | 0.7 | 38 | 1000 | 1000 | 1000 | | | | | 3114 | 55.7 | — | 0 | ○ | ○ | ○ | ○ |
| R. Ex. 143 | Bal. | 0.7 | 38 | 10000 | 5100 | 3000 | | | | | 18214 | 20.6 | — | 0 | ○ | ○ | ○ | ○ |
| R. Ex. 144 | Bal. | 0.7 | 38 | 10000 | 5100 | 0 | | | | | 15214 | 0.8 | — | 0 | ○ | ○ | ○ | ○ |
| R. Ex. 145 | Bal. | 0.7 | 38 | 10000 | 0 | 1000 | | | | | 11114 | 11.1 | — | 0 | ○ | ○ | ○ | ○ |
| R. Ex. 146 | Bal. | 0.7 | 38 | 0 | 5100 | 1000 | | | | | 6214 | 21.8 | — | 0 | ○ | ○ | ○ | ○ |
| R. Ex. 147 | Bal. | 0.7 | 38 | 150 | 300 | 150 | | | | | 714 | 58.7 | — | 0 | ○ | ○ | ○ | ○ |
| Ex. 148 | Bal. | 0.7 | 18 | 150 | 300 | 150 | 40 | | | | 654 | 45.3 | — | 40 | ○ | ○ | ○ | ○ |
| Ex. 149 | Bal. | 0.7 | 18 | 150 | 300 | 150 | 100 | | | | 654 | 45.3 | — | 100 | ○ | ○ | ○ | ○ |
| Ex. 150 | Bal. | 0.7 | 18 | 150 | 300 | 150 | 500 | | | | 854 | 45.3 | — | 500 | ○ | ○ | ○ | ○ |
| Ex. 151 | Bal. | 0.7 | 18 | 150 | 300 | 150 | 600 | | | | 854 | 45.3 | — | 600 | ○ | ○ | ○ | ○ |
| Ex. 152 | Bal. | 0.7 | 18 | 150 | 300 | 150 | | 20 | | | 654 | 45.3 | 0 | 20 | ○ | ○ | ○ | ○ |
| Ex. 153 | Bal. | 0.7 | 18 | 150 | 300 | 150 | | 100 | | | 654 | 45.3 | 0 | 100 | ○ | ○ | ○ | ○ |
| Ex. 154 | Bal. | 0.7 | 18 | 150 | 300 | 150 | 40 | 20 | | | 654 | 45.3 | 2 | 60 | ○ | ○ | ○ | ○ |
| Ex. 155 | Bal. | 0.7 | 18 | 150 | 300 | 150 | 40 | 10 | | | 654 | 45.3 | 4 | 50 | ○ | ○ | ○ | ○ |
| Ex. 156 | Bal. | 0.7 | 18 | 150 | 300 | 150 | 80 | 10 | | | 654 | 45.3 | 8 | 90 | ○ | ○ | ○ | ○ |
| Ex. 157 | Bal. | 0.7 | 18 | 150 | 300 | 150 | 500 | 10 | | | 654 | 45.3 | 50 | 510 | ○ | ○ | ○ | ○ |
| Ex. 158 | Bal. | 0.7 | 18 | 150 | 300 | 150 | 10 | 100 | | | 654 | 45.3 | 0.1 | 110 | ○ | ○ | ○ | ○ |
| Ex. 159 | Bal. | 0.7 | 18 | 150 | 300 | 150 | 100 | 100 | | | 654 | 45.3 | 1 | 200 | ○ | ○ | ○ | ○ |
| Ex. 160 | Bal. | 0.7 | 18 | 150 | 300 | 150 | 600 | 80 | | | 654 | 45.3 | 7.5 | 680 | ○ | ○ | ○ | ○ |
| Ex. 161 | Bal. | 0.7 | 18 | 150 | 300 | 150 | | | 20 | | 654 | 45.3 | — | 0 | ○ | ○ | ○ | ○ |
| Ex. 162 | Bal. | 0.7 | 18 | 150 | 300 | 150 | | | 100 | | 654 | 45.3 | — | 0 | ○ | ○ | ○ | ○ |

(Ex.: Example, R. Ex: Referential Example)

TABLE 7

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | $\Delta T$ | Wetta-bility | Total evaluation |
| Ex. 163 | Bal. | | 0.7 | 18 | 150 | 300 | 150 | | | 1200 | 654 | 45.3 | — | 0 | ○ | ○ | ○ | ○ |
| Ex. 164 | Bal. | | 0.7 | 18 | 150 | 300 | 150 | 40 | 20 | 20 | 654 | 45.3 | 2 | 60 | ○ | ○ | ○ | ○ |
| Ex. 165 | Bal. | | 0.7 | 18 | 150 | 300 | 150 | 100 | 50 | 50 | 654 | 45.3 | 2 | 150 | ○ | ○ | ○ | ○ |
| Ex. 166 | Bal. | | 0.7 | 18 | 150 | 300 | 150 | 500 | 50 | 30 | 654 | 45.3 | 10 | 550 | ○ | ○ | ○ | ○ |
| Ex. 167 | Bal. | 1 | 0.5 | 18 | 82 | 82 | 82 | | | | 300 | 82.9 | — | 0 | ○ | ○ | ○ | ○ |
| Ex. 168 | Bal. | 1 | 0.5 | 18 | 50 | 150 | 150 | | | | 404 | 102.0 | — | 0 | ○ | ○ | ○ | ○ |
| Ex. 169 | Bal. | 1 | 0.5 | 18 | 150 | 300 | 50 | | | | 554 | 23.1 | — | 0 | ○ | ○ | ○ | ○ |
| Ex. 170 | Bal. | 1 | 0.5 | 18 | 150 | 50 | 150 | | | | 404 | 102.0 | — | 0 | ○ | ○ | ○ | ○ |
| Ex. 171 | Bal. | 1 | 0.5 | 18 | 123 | 0 | 123 | | | | 300 | 143.9 | — | 0 | ○ | ○ | ○ | ○ |
| Ex. 172 | Bal. | 1 | 0.5 | 18 | 0 | 123 | 123 | | | | 300 | 143.9 | — | 0 | ○ | ○ | ○ | ○ |
| Ex. 173 | Bal. | 1 | 0.5 | 18 | 150 | 300 | 150 | | | | 654 | 45.3 | — | 0 | ○ | ○ | ○ | ○ |
| Ex. 174 | Bal. | 1 | 0.5 | 18 | 300 | 300 | 300 | | | | 954 | 59.0 | — | 0 | ○ | ○ | ○ | ○ |
| Ex. 175 | Bal. | 1 | 0.5 | 18 | 300 | 1000 | 1000 | | | | 2354 | 81.1 | — | 0 | ○ | ○ | ○ | ○ |
| Ex. 176 | Bal. | 1 | 0.5 | 18 | 1000 | 300 | 1000 | | | | 2354 | 81.1 | — | 0 | ○ | ○ | ○ | ○ |
| Ex. 177 | Bal. | 1 | 0.5 | 18 | 1000 | 1000 | 1000 | | | | 3054 | 52.7 | — | 0 | ○ | ○ | ○ | ○ |
| Ex. 178 | Bal. | 1 | 0.5 | 10 | 10000 | 5100 | 3000 | | | | 18130 | 20.1 | — | 0 | ○ | ○ | ○ | ○ |
| R. Ex. 179 | Bal. | 1 | 0.5 | 10 | 10000 | 5100 | 0 | | | | 15130 | 0.2 | — | 0 | ○ | ○ | ○ | ○ |
| Ex. 180 | Bal. | 1 | 0.5 | 10 | 10000 | 0 | 1000 | | | | 11030 | 10.3 | — | 0 | ○ | ○ | ○ | ○ |
| Ex. 181 | Bal. | 1 | 0.5 | 10 | 0 | 5100 | 1000 | | | | 6130 | 20.2 | — | 0 | ○ | ○ | ○ | ○ |
| Ex. 182 | Bal. | 1 | 0.5 | 10 | 150 | 300 | 150 | | | | 630 | 40.0 | — | 0 | ○ | ○ | ○ | ○ |
| Ex. 183 | Bal. | 1 | 0.5 | 14 | 86 | 86 | 86 | | | | 300 | 74.4 | — | 0 | ○ | ○ | ○ | ○ |
| Ex. 184 | Bal. | 1 | 0.5 | 14 | 50 | 150 | 150 | | | | 392 | 98.0 | — | 0 | ○ | ○ | ○ | ○ |
| Ex. 185 | Bal. | 1 | 0.5 | 14 | 150 | 300 | 50 | | | | 542 | 20.4 | — | 0 | ○ | ○ | ○ | ○ |
| Ex. 186 | Bal. | 1 | 0.5 | 14 | 150 | 50 | 150 | | | | 392 | 96.0 | — | 0 | ○ | ○ | ○ | ○ |
| Ex. 187 | Bal. | 1 | 0.5 | 14 | 200 | 0 | 200 | | | | 442 | 121.0 | — | 0 | ○ | ○ | ○ | ○ |
| Ex. 188 | Bal. | 1 | 0.5 | 14 | 0 | 200 | 200 | | | | 442 | 121.0 | — | 0 | ○ | ○ | ○ | ○ |
| Ex. 189 | Bal. | 1 | 0.5 | 14 | 150 | 300 | 150 | | | | 642 | 42.7 | — | 0 | ○ | ○ | ○ | ○ |

(Ex.: Example, R. Ex: Referential Example)

TABLE 8

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | $\Delta T$ | Wetta-bility | Total evaluation |
| Ex. 190 | Bal. | 1 | 0.5 | 14 | 300 | 300 | 300 | | | | 942 | 57.0 | — | 0 | ○ | ○ | ○ | ○ |
| Ex. 191 | Bal. | 1 | 0.5 | 14 | 300 | 1000 | 1000 | | | | 2342 | 80.2 | — | 0 | ○ | ○ | ○ | ○ |
| Ex. 192 | Bal. | 1 | 0.5 | 14 | 1000 | 300 | 1000 | | | | 2342 | 80.2 | — | 0 | ○ | ○ | ○ | ○ |
| Ex. 193 | Bal. | 1 | 0.5 | 14 | 1000 | 1000 | 1000 | | | | 3042 | 82.1 | — | 0 | ○ | ○ | ○ | ○ |
| Ex. 194 | Bal. | 1 | 0.5 | 14 | 10000 | 5100 | 3000 | | | | 18142 | 20.1 | — | 0 | ○ | ○ | ○ | ○ |
| R. Ex. 195 | Bal. | 1 | 0.5 | 14 | 10000 | 5100 | 0 | | | | 15142 | 0.3 | — | 0 | ○ | ○ | ○ | ○ |
| Ex. 196 | Bal. | 1 | 0.5 | 14 | 10000 | 0 | 1000 | | | | 11042 | 10.4 | — | 0 | ○ | ○ | ○ | ○ |
| Ex. 197 | Bal. | 1 | 0.5 | 14 | 0 | 5100 | 1000 | | | | 6142 | 20.4 | — | 0 | ○ | ○ | ○ | ○ |
| Ex. 198 | Bal. | 1 | 0.5 | 14 | 150 | 300 | 150 | | | | 842 | 42.7 | — | 0 | ○ | ○ | ○ | ○ |
| Ex. 199 | Bal. | 1 | 0.5 | 24 | 82 | 82 | 82 | | | | 318 | 93.9 | — | 0 | ○ | ○ | ○ | ○ |
| Ex. 200 | Bal. | 1 | 0.5 | 24 | 50 | 150 | 150 | | | | 422 | 111.0 | — | 0 | ○ | ○ | ○ | ○ |
| Ex. 201 | Bal. | 1 | 0.5 | 24 | 150 | 300 | 50 | | | | 572 | 27.1 | — | 0 | ○ | ○ | ○ | ○ |
| Ex. 202 | Bal. | 1 | 0.5 | 24 | 150 | 50 | 150 | | | | 422 | 111.0 | — | 0 | ○ | ○ | ○ | ○ |
| Ex. 203 | Bal. | 1 | 0.5 | 24 | 123 | 0 | 123 | | | | 318 | 158.5 | — | 0 | ○ | ○ | ○ | ○ |
| Ex. 204 | Bal. | 1 | 0.5 | 24 | 0 | 123 | 123 | | | | 318 | 158.5 | — | 0 | ○ | ○ | ○ | ○ |
| Ex. 205 | Bal. | 1 | 0.5 | 24 | 150 | 300 | 150 | | | | 672 | 49.3 | — | 0 | ○ | ○ | ○ | ○ |
| Ex. 206 | Bal. | 1 | 0.5 | 24 | 300 | 300 | 300 | | | | 972 | 62.0 | — | 0 | ○ | ○ | ○ | ○ |
| Ex. 207 | Bal. | 1 | 0.5 | 24 | 300 | 1000 | 1000 | | | | 2372 | 82.5 | — | 0 | ○ | ○ | ○ | ○ |
| Ex. 208 | Bal. | 1 | 0.5 | 24 | 1000 | 300 | 1000 | | | | 2372 | 82.5 | — | 0 | ○ | ○ | ○ | ○ |
| Ex. 209 | Bal. | 1 | 0.5 | 24 | 1000 | 1000 | 1000 | | | | 3072 | 53.6 | — | 0 | ○ | ○ | ○ | ○ |
| Ex. 210 | Bal. | 1 | 0.5 | 24 | 10000 | 5100 | 3000 | | | | 18172 | 20.3 | — | 0 | ○ | ○ | ○ | ○ |
| R. Ex. 211 | Bal. | 1 | 0.5 | 24 | 10000 | 5100 | 0 | | | | 15172 | 0.5 | — | 0 | ○ | ○ | ○ | ○ |
| Ex. 212 | Bal. | 1 | 0.5 | 24 | 10000 | 0 | 1000 | | | | 11072 | 10.7 | — | 0 | ○ | ○ | ○ | ○ |
| Ex. 213 | Bal. | 1 | 0.5 | 24 | 0 | 5100 | 1000 | | | | 6172 | 21.0 | — | 0 | ○ | ○ | ○ | ○ |
| Ex. 214 | Bal. | 1 | 0.5 | 24 | 150 | 300 | 150 | | | | 672 | 49.3 | — | 0 | ○ | ○ | ○ | ○ |
| R. Ex. 215 | Bal. | 1 | 0.5 | 38 | 82 | 82 | 82 | | | | 360 | 119.5 | — | 0 | ○ | ○ | ○ | ○ |
| R. Ex. 216 | Bal. | 1 | 0.5 | 38 | 50 | 150 | 150 | | | | 464 | 132.0 | — | 0 | ○ | ○ | ○ | ○ |

(Ex.: Example, R. Ex: Referential Example)

TABLE 9

| | Alloy constitution | | | | | | | | | | | Formula (1) | Formula (2) | Formula (3) | Formula (4) | Evaluation item | | | |
|---|---|---|---|---|---|---|---|---|---|---|---|---|---|---|---|---|---|---|---|
| | | | | (As, Bi, Pb, Sb: ppm by mass, Ag, Cu: % by mass) | | | | | | | | | | | | Change over time | ΔT | Wetta-bility | Total evalu-ation |
| | Sn | Ag | Cu | As | Bi | Pb | Sb | Ni | Fe | In | | | | | | | | | |
| R. Ex. 217 | Bal. | 1 | 0.5 | 38 | 150 | 300 | 50 | | | | 614 | 36.4 | — | 0 | ○ | ○ | ○ | ○ |
| R. Ex. 218 | Bal. | 1 | 0.5 | 38 | 150 | 50 | 150 | | | | 464 | 132.0 | — | 0 | ○ | ○ | ○ | ○ |
| R. Ex. 219 | Bal. | 1 | 0.5 | 38 | 123 | 0 | 123 | | | | 360 | 192.7 | — | 0 | ○ | ○ | ○ | ○ |
| R. Ex. 220 | Bal. | 1 | 0.5 | 38 | 0 | 123 | 123 | | | | 360 | 192.7 | — | 0 | ○ | ○ | ○ | ○ |
| R. Ex. 221 | Bal. | 1 | 0.5 | 38 | 150 | 300 | 150 | | | | 714 | 58.7 | — | 0 | ○ | ○ | ○ | ○ |
| R. Ex. 222 | Bal. | 1 | 0.5 | 38 | 300 | 300 | 300 | | | | 1014 | 69.0 | — | 0 | ○ | ○ | ○ | ○ |
| R. Ex. 223 | Bal. | 1 | 0.5 | 38 | 300 | 1000 | 1000 | | | | 2414 | 85.7 | — | 0 | ○ | ○ | ○ | ○ |
| R. Ex. 224 | Bal. | 1 | 0.5 | 38 | 1000 | 300 | 1000 | | | | 2414 | 85.7 | — | 0 | ○ | ○ | ○ | ○ |
| R. Ex. 225 | Bal. | 1 | 0.5 | 38 | 1000 | 1000 | 1000 | | | | 3114 | 55.7 | — | 0 | ○ | ○ | ○ | ○ |
| R. Ex. 226 | Bal. | 1 | 0.5 | 38 | 10000 | 5100 | 3000 | | | | 18214 | 20.6 | — | 0 | ○ | ○ | ○ | ○ |
| R. Ex. 227 | Bal. | 1 | 0.5 | 38 | 10000 | 5100 | 0 | | | | 15214 | 0.8 | — | 0 | ○ | ○ | ○ | ○ |
| R. Ex. 228 | Bal. | 1 | 0.5 | 38 | 10000 | 0 | 1000 | | | | 11114 | 11.1 | — | 0 | ○ | ○ | ○ | ○ |
| R. Ex. 229 | Bal. | 1 | 0.5 | 38 | 0 | 5100 | 1000 | | | | 8214 | 21.8 | — | 0 | ○ | ○ | ○ | ○ |
| R. Ex. 230 | Bal. | 1 | 0.5 | 38 | 150 | 300 | 150 | | | | 714 | 58.7 | — | 0 | ○ | ○ | ○ | ○ |
| Ex. 231 | Bal. | 1 | 0.5 | 18 | 150 | 300 | 150 | 40 | | | 654 | 45.3 | — | 40 | ○ | ○ | ○ | ○ |
| Ex. 232 | Bal. | 1 | 0.5 | 18 | 150 | 300 | 150 | 100 | | | 654 | 45.3 | — | 100 | ○ | ○ | ○ | ○ |
| Ex. 233 | Bal. | 1 | 0.5 | 18 | 150 | 300 | 150 | 500 | | | 654 | 45.3 | — | 500 | ○ | ○ | ○ | ○ |
| Ex. 234 | Bal. | 1 | 0.5 | 18 | 150 | 300 | 150 | 600 | | | 654 | 45.3 | — | 600 | ○ | ○ | ○ | ○ |
| Ex. 235 | Bal. | 1 | 0.5 | 18 | 150 | 300 | 150 | | 20 | | 654 | 45.3 | 0 | 20 | ○ | ○ | ○ | ○ |
| Ex. 236 | Bal. | 1 | 0.5 | 18 | 150 | 300 | 150 | | 100 | | 654 | 45.3 | 0 | 100 | ○ | ○ | ○ | ○ |
| Ex. 237 | Bal. | 1 | 0.5 | 18 | 150 | 300 | 150 | 40 | 20 | | 654 | 45.3 | 2 | 80 | ○ | ○ | ○ | ○ |
| Ex. 238 | Bal. | 1 | 0.5 | 18 | 150 | 300 | 150 | 40 | 10 | | 654 | 45.3 | 4 | 50 | ○ | ○ | ○ | ○ |
| Ex. 239 | Bal. | 1 | 0.5 | 18 | 150 | 300 | 150 | 80 | 10 | | 654 | 45.3 | 8 | 90 | ○ | ○ | ○ | ○ |
| Ex. 240 | Bal. | 1 | 0.5 | 18 | 150 | 300 | 150 | 500 | 10 | | 654 | 45.3 | 50 | 510 | ○ | ○ | ○ | ○ |
| Ex. 241 | Bal. | 1 | 0.5 | 18 | 150 | 300 | 150 | 10 | 100 | | 654 | 45.3 | 0.1 | 110 | ○ | ○ | ○ | ○ |
| Ex. 242 | Bal. | 1 | 0.5 | 18 | 150 | 200 | 150 | 100 | 100 | | 654 | 45.3 | 1 | 200 | ○ | ○ | ○ | ○ |
| Ex. 243 | Bal. | 1 | 0.5 | 18 | 150 | 300 | 150 | 600 | 80 | | 654 | 45.3 | 7.5 | 680 | ○ | ○ | ○ | ○ |

(Ex.: Example, R. Ex: Referential Example)

TABLE 10

| | Alloy constitution | | | | | | | | | | | Formula (1) | Formula (2) | Formula (3) | Formula (4) | Evaluation item | | | |
|---|---|---|---|---|---|---|---|---|---|---|---|---|---|---|---|---|---|---|---|
| | | | | (As, Bi, Pb, Sb: ppm by mass, Ag, Cu: % by mass) | | | | | | | | | | | | Change over time | ΔT | Wetta-bility | Total evalu-ation |
| | Sn | Ag | Cu | As | Bi | Pb | Sb | Ni | Fe | In | | | | | | | | | |
| Ex. 244 | Bal. | 1 | 0.5 | 18 | 150 | 300 | 150 | | | 20 | 654 | 45.3 | — | 0 | ○ | ○ | ○ | ○ |
| Ex. 245 | Bal. | 1 | 0.5 | 18 | 150 | 300 | 150 | | | 100 | 654 | 45.3 | — | 0 | ○ | ○ | ○ | ○ |
| Ex. 246 | Bal. | 1 | 0.5 | 18 | 150 | 300 | 150 | | | 1200 | 654 | 45.3 | — | 0 | ○ | ○ | ○ | ○ |
| Ex. 247 | Bal. | 1 | 0.5 | 18 | 150 | 300 | 150 | 40 | 20 | 20 | 654 | 45.3 | 2 | 60 | ○ | ○ | ○ | ○ |
| Ex. 248 | Bal. | 1 | 0.5 | 18 | 150 | 300 | 150 | 100 | 50 | 50 | 654 | 45.3 | 2 | 150 | ○ | ○ | ○ | ○ |
| Ex. 249 | Bal. | 1 | 0.5 | 18 | 150 | 300 | 150 | 500 | 50 | 30 | 654 | 45.3 | 10 | 550 | ○ | ○ | ○ | ○ |
| Ex. 250 | Bal. | 2 | 0.5 | 18 | 82 | 82 | 82 | | | | 300 | 82.9 | — | 0 | ○ | ○ | ○ | ○ |
| Ex. 251 | Bal. | 2 | 0.5 | 18 | 50 | 150 | 150 | | | | 404 | 102.0 | — | 0 | ○ | ○ | ○ | ○ |
| Ex. 252 | Bal. | 2 | 0.5 | 18 | 150 | 300 | 50 | | | | 554 | 23.1 | — | 0 | ○ | ○ | ○ | ○ |
| Ex. 253 | Bal. | 2 | 0.5 | 18 | 150 | 50 | 150 | | | | 404 | 102.0 | — | 0 | ○ | ○ | ○ | ○ |
| Ex. 254 | Bal. | 2 | 0.5 | 18 | 123 | 0 | 123 | | | | 300 | 143.9 | — | 0 | ○ | ○ | ○ | ○ |
| Ex. 255 | Bal. | 2 | 0.5 | 18 | 0 | 123 | 123 | | | | 300 | 143.9 | — | 0 | ○ | ○ | ○ | ○ |
| Ex. 256 | Bal. | 2 | 0.5 | 18 | 350 | 300 | 150 | | | | 654 | 45.3 | — | 0 | ○ | ○ | ○ | ○ |
| Ex. 257 | Bal. | 2 | 0.5 | 18 | 300 | 300 | 300 | | | | 954 | 59.0 | — | 0 | ○ | ○ | ○ | ○ |
| Ex. 258 | Bal. | 2 | 0.5 | 18 | 300 | 1000 | 1000 | | | | 2354 | 81.1 | — | 0 | ○ | ○ | ○ | ○ |
| Ex. 259 | Bal. | 2 | 0.5 | 18 | 1000 | 300 | 1000 | | | | 2354 | 81.1 | — | 0 | ○ | ○ | ○ | ○ |
| Ex. 260 | Bal. | 2 | 0.5 | 18 | 1000 | 1000 | 1000 | | | | 3054 | 52.7 | — | 0 | ○ | ○ | ○ | ○ |
| Ex. 261 | Bal. | 2 | 0.5 | 10 | 10000 | 5100 | 3000 | | | | 18130 | 20.1 | — | 0 | ○ | ○ | ○ | ○ |
| R. Ex. 262 | Bal. | 2 | 0.5 | 10 | 10000 | 5100 | 0 | | | | 15130 | 0.2 | — | 0 | ○ | ○ | ○ | ○ |
| Ex. 263 | Bal. | 2 | 0.5 | 10 | 10000 | 0 | 1000 | | | | 11030 | 10.3 | — | 0 | ○ | ○ | ○ | ○ |
| Ex. 264 | Bal. | 2 | 0.5 | 10 | 0 | 5100 | 1000 | | | | 6130 | 20.2 | — | 0 | ○ | ○ | ○ | ○ |
| Ex. 265 | Bal. | 2 | 0.5 | 10 | 150 | 300 | 150 | | | | 630 | 40.0 | — | 0 | ○ | ○ | ○ | ○ |
| Ex. 266 | Bal. | 2 | 0.5 | 14 | 86 | 86 | 86 | | | | 300 | 74.4 | — | 0 | ○ | ○ | ○ | ○ |
| Ex. 267 | Bal. | 2 | 0.5 | 14 | 50 | 150 | 150 | | | | 392 | 96.0 | — | 0 | ○ | ○ | ○ | ○ |
| Ex. 268 | Bal. | 2 | 0.5 | 14 | 150 | 300 | 50 | | | | 542 | 20.4 | — | 0 | ○ | ○ | ○ | ○ |
| Ex. 269 | Bal. | 2 | 0.5 | 14 | 150 | 50 | 150 | | | | 392 | 98.0 | — | 0 | ○ | ○ | ○ | ○ |
| Ex. 270 | Bal. | 2 | 0.5 | 14 | 200 | 0 | 150 | | | | 442 | 121.0 | — | 0 | ○ | ○ | ○ | ○ |

(Ex.: Example, R. Ex: Referential Example)

TABLE 11

| | Alloy constitution | | | | | | | | | | | Formula (1) | Formula (2) | Formula (3) | Formula (4) | Evaluation item | | | |
|---|---|---|---|---|---|---|---|---|---|---|---|---|---|---|---|---|---|---|---|
| | (As, Bi, Pb, Sb: ppm by mass, Ag, Cu: % by mass) | | | | | | | | | | | | | | | Change over time | ΔT | Wetta-bility | Total evalu-ation |
| | Sn | Ag | Cu | As | Bi | Pb | Sb | Ni | Fe | In | | | | | | | | | |
| Ex. 271 | Bal. | 2 | 0.5 | 14 | 0 | 200 | 200 | | | | 442 | 121.0 | — | 0 | ○ | ○ | ○ | ○ |
| Ex. 272 | Bal. | 2 | 0.5 | 14 | 150 | 300 | 150 | | | | 842 | 42.7 | — | 0 | ○ | ○ | ○ | ○ |
| Ex. 273 | Bal. | 2 | 0.5 | 14 | 300 | 300 | 30 | | | | 942 | 57.0 | — | 0 | ○ | ○ | ○ | ○ |
| Ex. 274 | Bal. | 2 | 0.5 | 14 | 300 | 1000 | 1000 | | | | 2342 | 80.2 | — | 0 | ○ | ○ | ○ | ○ |
| Ex. 275 | Bal. | 2 | 0.5 | 14 | 1000 | 300 | 1000 | | | | 2342 | 80.2 | — | 0 | ○ | ○ | ○ | ○ |
| Ex. 278 | Bal. | 2 | 0.5 | 14 | 1000 | 1000 | 1000 | | | | 3042 | 52.1 | — | 0 | ○ | ○ | ○ | ○ |
| Ex. 277 | Bal. | 2 | 0.5 | 14 | 10000 | 5100 | 3000 | | | | 18142 | 20.1 | — | 0 | ○ | ○ | ○ | ○ |
| R. Ex. 278 | Bal. | 2 | 0.5 | 14 | 10000 | 5100 | 0 | | | | 15142 | 0.3 | — | 0 | ○ | ○ | ○ | ○ |
| Ex. 279 | Bal. | 2 | 0.5 | 14 | 10000 | 0 | 1000 | | | | 11042 | 10.4 | — | 0 | ○ | ○ | ○ | ○ |
| Ex. 280 | Bal. | 2 | 0.5 | 14 | 0 | 5100 | 1000 | | | | 6142 | 20.4 | — | 0 | ○ | ○ | ○ | ○ |
| Ex. 281 | Bal. | 2 | 0.5 | 14 | 150 | 300 | 150 | | | | 642 | 42.7 | — | 0 | ○ | ○ | ○ | ○ |
| Ex. 282 | Bal. | 2 | 0.5 | 24 | 82 | 82 | 82 | | | | 318 | 93.9 | — | 0 | ○ | ○ | ○ | ○ |
| Ex. 283 | Bal. | 2 | 0.5 | 24 | 50 | 150 | 150 | | | | 422 | 111.0 | — | 0 | ○ | ○ | ○ | ○ |
| Ex. 284 | Bal. | 2 | 0.5 | 24 | 150 | 300 | 50 | | | | 572 | 27.1 | — | 0 | ○ | ○ | ○ | ○ |
| Ex. 285 | Bal. | 2 | 0.5 | 24 | 150 | 50 | 150 | | | | 422 | 111.0 | — | 0 | ○ | ○ | ○ | ○ |
| Ex. 286 | Bal. | 2 | 0.5 | 24 | 123 | 0 | 123 | | | | 318 | 158.5 | — | 0 | ○ | ○ | ○ | ○ |
| Ex. 287 | Bal. | 2 | 0.5 | 24 | 0 | 123 | 123 | | | | 318 | 158.5 | — | 0 | ○ | ○ | ○ | ○ |
| Ex. 288 | Bal. | 2 | 0.5 | 24 | 150 | 300 | 150 | | | | 672 | 49.3 | — | 0 | ○ | ○ | ○ | ○ |
| Ex. 289 | Bal. | 2 | 0.5 | 24 | 300 | 300 | 300 | | | | 972 | 62.0 | — | 0 | ○ | ○ | ○ | ○ |
| Ex. 290 | Bal. | 2 | 0.5 | 24 | 300 | 1000 | 1000 | | | | 2372 | 82.5 | — | 0 | ○ | ○ | ○ | ○ |
| Ex. 291 | Bal. | 2 | 0.5 | 24 | 1000 | 300 | 1000 | | | | 2372 | 82.5 | — | 0 | ○ | ○ | ○ | ○ |
| Ex. 292 | Bal. | 2 | 0.5 | 24 | 1000 | 1000 | 1000 | | | | 3072 | 53.6 | — | 0 | ○ | ○ | ○ | ○ |
| Ex. 293 | Bal. | 2 | 0.5 | 24 | 10000 | 5100 | 3000 | | | | 18172 | 20.3 | — | 0 | ○ | ○ | ○ | ○ |
| R. Ex. 294 | Bal. | 2 | 0.5 | 24 | 10000 | 5100 | 0 | | | | 15172 | 0.5 | — | 0 | ○ | ○ | ○ | ○ |
| Ex. 295 | Bal. | 2 | 0.5 | 24 | 10000 | 0 | 1000 | | | | 11072 | 10.7 | — | 0 | ○ | ○ | ○ | ○ |
| Ex. 296 | Bal. | 2 | 0.5 | 24 | 0 | 5100 | 1000 | | | | 8172 | 21.0 | — | 0 | ○ | ○ | ○ | ○ |
| Ex. 297 | Bal. | 2 | 0.5 | 24 | 150 | 300 | 150 | | | | 672 | 49.3 | — | 0 | ○ | ○ | ○ | ○ |

(Ex.: Example, R. Ex: Referential Example)

TABLE 12

| | Alloy constitution | | | | | | | | | | | Formula (1) | Formula (2) | Formula (3) | Formula (4) | Evaluation item | | | |
|---|---|---|---|---|---|---|---|---|---|---|---|---|---|---|---|---|---|---|---|
| | (As, Bi, Pb, Sb: ppm by mass, Ag, Cu: % by mass) | | | | | | | | | | | | | | | Change over time | ΔT | Wetta-bility | Total evalu-ation |
| | Sn | Ag | Cu | As | Bi | Pb | Sb | Ni | Fe | In | | | | | | | | | |
| R. Ex. 298 | Bal. | 2 | 0.5 | 38 | 82 | 82 | 82 | | | | 360 | 119.5 | — | 0 | ○ | ○ | ○ | ○ |
| R. Ex. 299 | Bal. | 2 | 0.5 | 38 | 50 | 150 | 150 | | | | 464 | 132.0 | — | 0 | ○ | ○ | ○ | ○ |
| R. Ex. 300 | Bal. | 2 | 0.5 | 38 | 150 | 300 | 50 | | | | 614 | 36.4 | — | 0 | ○ | ○ | ○ | ○ |
| R. Ex. 301 | Bal. | 2 | 0.5 | 38 | 150 | 50 | 150 | | | | 484 | 132.0 | — | 0 | ○ | ○ | ○ | ○ |
| R. Ex. 302 | Bal. | 2 | 0.5 | 38 | 123 | 0 | 123 | | | | 360 | 192.7 | — | 0 | ○ | ○ | ○ | ○ |
| R. Ex. 303 | Bal. | 2 | 0.5 | 38 | 0 | 123 | 123 | | | | 360 | 192.7 | — | 0 | ○ | ○ | ○ | ○ |
| R. Ex. 304 | Bal. | 2 | 0.5 | 38 | 150 | 300 | 150 | | | | 714 | 58.7 | — | 0 | ○ | ○ | ○ | ○ |
| R. Ex. 305 | Bal. | 2 | 0.5 | 38 | 300 | 300 | 300 | | | | 1014 | 89.0 | — | 0 | ○ | ○ | ○ | ○ |
| R. Ex. 306 | Bal. | 2 | 0.5 | 38 | 300 | 1000 | 1000 | | | | 2414 | 85.7 | — | 0 | ○ | ○ | ○ | ○ |
| R. Ex. 307 | Bal. | 2 | 0.5 | 38 | 1000 | 300 | 1000 | | | | 2414 | 85.7 | — | 0 | ○ | ○ | ○ | ○ |
| R. Ex. 308 | Bal. | 2 | 0.5 | 38 | 1000 | 1000 | 1000 | | | | 3114 | 55.7 | — | 0 | ○ | ○ | ○ | ○ |
| R. Ex. 309 | Bal. | 2 | 0.5 | 38 | 10000 | 5100 | 3000 | | | | 18214 | 20.6 | — | 0 | ○ | ○ | ○ | ○ |
| R. Ex. 310 | Bal. | 2 | 0.5 | 38 | 10000 | 5100 | 0 | | | | 15214 | 0.8 | — | 0 | ○ | ○ | ○ | ○ |
| R. Ex. 311 | Bal. | 2 | 0.5 | 38 | 10000 | 0 | 1000 | | | | 11114 | 11.1 | — | 0 | ○ | ○ | ○ | ○ |
| R. Ex. 312 | Bal. | 2 | 0.5 | 38 | 0 | 5100 | 1000 | | | | 6214 | 21.8 | — | 0 | ○ | ○ | ○ | ○ |
| R. Ex. 313 | Bal. | 2 | 0.5 | 38 | 150 | 300 | 150 | | | | 714 | 45.3 | — | 0 | ○ | ○ | ○ | ○ |
| Ex. 314 | Bal. | 2 | 0.5 | 18 | 150 | 300 | 150 | 40 | | | 654 | 45.3 | — | 40 | ○ | ○ | ○ | ○ |
| Ex. 315 | Bal. | 2 | 0.5 | 18 | 150 | 300 | 150 | 100 | | | 654 | 45.3 | — | 100 | ○ | ○ | ○ | ○ |
| Ex. 316 | Bal. | 2 | 0.5 | 18 | 150 | 300 | 150 | 500 | | | 654 | 45.3 | — | 500 | ○ | ○ | ○ | ○ |
| Ex. 317 | Bal. | 2 | 0.5 | 18 | 150 | 300 | 150 | 600 | | | 654 | 45.3 | — | 600 | ○ | ○ | ○ | ○ |
| Ex. 318 | Bal. | 2 | 0.5 | 18 | 150 | 300 | 150 | | 20 | | 654 | 45.3 | 0 | 20 | ○ | ○ | ○ | ○ |
| Ex. 319 | Bal. | 2 | 0.5 | 18 | 150 | 300 | 150 | | 100 | | 654 | 45.3 | 0 | 100 | ○ | ○ | ○ | ○ |
| Ex. 320 | Bal. | 2 | 0.5 | 18 | 150 | 300 | 150 | 40 | 20 | | 654 | 45.3 | 2 | 80 | ○ | ○ | ○ | ○ |
| Ex. 321 | Bal. | 2 | 0.5 | 18 | 150 | 300 | 150 | 40 | 10 | | 654 | 45.3 | 4 | 50 | ○ | ○ | ○ | ○ |
| Ex. 322 | Bal. | 2 | 0.5 | 18 | 150 | 300 | 150 | 80 | 10 | | 654 | 45.3 | 8 | 90 | ○ | ○ | ○ | ○ |
| Ex. 323 | Bal. | 2 | 0.5 | 18 | 150 | 300 | 150 | 500 | 10 | | 654 | 45.3 | 50 | 510 | ○ | ○ | ○ | ○ |
| Ex. 324 | Bal. | 2 | 0.5 | 18 | 150 | 300 | 150 | 10 | 100 | | 654 | 45.3 | 0.1 | 110 | ○ | ○ | ○ | ○ |

(Ex.: Example, R. Ex: Referential Example)

TABLE 13

| | Alloy constitution (As, Bi, Pb, Sb: ppm by mass, Ag, Cu: % by mass) | | | | | | | | | Formula (1) | Formula (2) | Formula (3) | Formula (4) | Evaluation item | | | |
|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evaluation |
| Ex. 325 | Bal. | 2 | 0.5 | 18 | 150 | 300 | 150 | 100 | 100 | | 654 | 45.3 | 1 | 200 | ○ | ○ | ○ | ○ |
| Ex. 326 | Bal. | 2 | 0.5 | 18 | 150 | 300 | 150 | 600 | 80 | | 654 | 45.3 | 7.5 | 680 | ○ | ○ | ○ | ○ |
| Ex. 327 | Bal. | 2 | 0.5 | 18 | 150 | 300 | 150 | | | 20 | 654 | 45.3 | — | 0 | ○ | ○ | ○ | ○ |
| Ex. 328 | Bal. | 2 | 0.5 | 18 | 150 | 300 | 150 | | | 100 | 654 | 45.3 | — | 0 | ○ | ○ | ○ | ○ |
| Ex. 329 | Bal. | 2 | 0.5 | 18 | 150 | 300 | 150 | | | 1200 | 654 | 45.3 | — | 0 | ○ | ○ | ○ | ○ |
| Ex. 330 | Bal. | 2 | 0.5 | 18 | 150 | 300 | 150 | 40 | 20 | 20 | 654 | 45.3 | 2 | 60 | ○ | ○ | ○ | ○ |
| Ex. 331 | Bal. | 2 | 0.5 | 18 | 150 | 300 | 150 | 100 | 50 | 50 | 654 | 45.3 | 2 | 150 | ○ | ○ | ○ | ○ |
| Ex. 332 | Bal. | 2 | 0.5 | 18 | 150 | 300 | 150 | 500 | 50 | 30 | 654 | 45.3 | 10 | 550 | ○ | ○ | ○ | ○ |
| Ex. 333 | Bal. | 3 | 0.5 | 18 | 82 | 82 | 82 | | | | 300 | 82.9 | — | 0 | ○ | ○ | ○ | ○ |
| Ex. 334 | Bal. | 3 | 0.5 | 18 | 50 | 150 | 150 | | | | 404 | 102.0 | — | 0 | ○ | ○ | ○ | ○ |
| Ex. 335 | Bal. | 3 | 0.5 | 18 | 150 | 300 | 50 | | | | 554 | 23.1 | — | 0 | ○ | ○ | ○ | ○ |
| Ex. 336 | Bal. | 3 | 0.5 | 18 | 150 | 50 | 150 | | | | 404 | 102.0 | — | 0 | ○ | ○ | ○ | ○ |
| Ex. 337 | Bal. | 3 | 0.5 | 18 | 123 | 0 | 123 | | | | 300 | 143.9 | — | 0 | ○ | ○ | ○ | ○ |
| Ex. 338 | Bal. | 3 | 0.5 | 18 | 0 | 123 | 123 | | | | 300 | 143.9 | — | 0 | ○ | ○ | ○ | ○ |
| Ex. 339 | Bal. | 3 | 0.5 | 18 | 150 | 300 | 150 | | | | 654 | 45.3 | — | 0 | ○ | ○ | ○ | ○ |
| Ex. 340 | Bal. | 3 | 0.5 | 18 | 300 | 300 | 300 | | | | 954 | 59.0 | — | 0 | ○ | ○ | ○ | ○ |
| Ex. 341 | Bal. | 3 | 0.5 | 18 | 300 | 1000 | 1000 | | | | 2354 | 81.1 | — | 0 | ○ | ○ | ○ | ○ |
| Ex. 342 | Bal. | 3 | 0.5 | 18 | 1000 | 300 | 1000 | | | | 2354 | 81.1 | — | 0 | ○ | ○ | ○ | ○ |
| Ex. 343 | Bal. | 3 | 0.5 | 18 | 1000 | 1000 | 1000 | | | | 3054 | 52.7 | — | 0 | ○ | ○ | ○ | ○ |
| Ex. 344 | Bal. | 3 | 0.5 | 10 | 10000 | 5100 | 3000 | | | | 18130 | 20.1 | — | 0 | ○ | ○ | ○ | ○ |
| R. Ex. 345 | Bal. | 3 | 0.5 | 10 | 10000 | 5100 | 0 | | | | 15130 | 0.2 | — | 0 | ○ | ○ | ○ | ○ |
| Ex. 346 | Bal. | 3 | 0.5 | 10 | 10000 | 0 | 1000 | | | | 11030 | 10.3 | — | 0 | ○ | ○ | ○ | ○ |
| Ex. 347 | Bal. | 3 | 0.5 | 10 | 0 | 5100 | 1000 | | | | 6130 | 20.2 | — | 0 | ○ | ○ | ○ | ○ |
| Ex. 348 | Bal. | 3 | 0.5 | 10 | 150 | 300 | 150 | | | | 630 | 40.0 | — | 0 | ○ | ○ | ○ | ○ |
| Ex. 349 | Bal. | 3 | 0.5 | 14 | 86 | 86 | 86 | | | | 300 | 74.4 | — | 0 | ○ | ○ | ○ | ○ |
| Ex. 350 | Bal. | 3 | 0.5 | 14 | 50 | 150 | 150 | | | | 392 | 96.0 | — | 0 | ○ | ○ | ○ | ○ |
| Ex. 351 | Bal. | 3 | 0.5 | 14 | 150 | 300 | 50 | | | | 542 | 20.4 | — | 0 | ○ | ○ | ○ | ○ |

(Ex.: Example, R. Ex: Referential Example)

TABLE 14

| | Alloy constitution (As, Bi, Pb, Sb: ppm by mass, Ag, Cu: % by mass) | | | | | | | | | Formula (1) | Formula (2) | Formula (3) | Formula (4) | Evaluation item | | | |
|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evaluation |
| Ex. 352 | Bal. | 3 | 0.5 | 14 | 150 | 50 | 150 | | | | 392 | 96.0 | — | 0 | ○ | ○ | ○ | ○ |
| Ex. 353 | Bal. | 3 | 0.5 | 14 | 200 | 0 | 200 | | | | 442 | 121.0 | — | 0 | ○ | ○ | ○ | ○ |
| Ex. 354 | Bal. | 3 | 0.5 | 14 | 0 | 200 | 200 | | | | 442 | 121.0 | — | 0 | ○ | ○ | ○ | ○ |
| Ex. 355 | Bal. | 3 | 0.5 | 14 | 150 | 300 | 150 | | | | 642 | 42.7 | — | 0 | ○ | ○ | ○ | ○ |
| Ex. 356 | Bal. | 3 | 0.5 | 14 | 300 | 300 | 300 | | | | 942 | 57.0 | — | 0 | ○ | ○ | ○ | ○ |
| Ex. 357 | Bal. | 3 | 0.5 | 14 | 300 | 1000 | 1000 | | | | 2342 | 80.2 | — | 0 | ○ | ○ | ○ | ○ |
| Ex. 358 | Bal. | 3 | 0.5 | 14 | 1000 | 300 | 1000 | | | | 2342 | 80.2 | — | 0 | ○ | ○ | ○ | ○ |
| Ex. 359 | Bal. | 3 | 0.5 | 14 | 1000 | 1000 | 1000 | | | | 3042 | 52.1 | — | 0 | ○ | ○ | ○ | ○ |
| Ex. 360 | Bal. | 3 | 0.5 | 14 | 10000 | 5100 | 3000 | | | | 18142 | 20.1 | — | 0 | ○ | ○ | ○ | ○ |
| R. Ex. 361 | Bal. | 3 | 0.5 | 14 | 10000 | 5100 | 0 | | | | 15142 | 0.3 | — | 0 | ○ | ○ | ○ | ○ |
| Ex. 362 | Bal. | 3 | 0.5 | 14 | 10000 | 0 | 1000 | | | | 11042 | 10.4 | — | 0 | ○ | ○ | ○ | ○ |
| Ex. 363 | Bal. | 3 | 0.5 | 14 | 0 | 5100 | 1000 | | | | 6142 | 20.4 | — | 0 | ○ | ○ | ○ | ○ |
| Ex. 364 | Bal. | 3 | 0.5 | 14 | 150 | 300 | 150 | | | | 642 | 42.7 | — | 0 | ○ | ○ | ○ | ○ |
| Ex. 365 | Bal. | 3 | 0.5 | 24 | 82 | 82 | 82 | | | | 318 | 93.9 | — | 0 | ○ | ○ | ○ | ○ |
| Ex. 366 | Bal. | 3 | 0.5 | 24 | 50 | 150 | 150 | | | | 422 | 111.0 | — | 0 | ○ | ○ | ○ | ○ |
| Ex. 367 | Bal. | 3 | 0.5 | 24 | 150 | 300 | 50 | | | | 572 | 27.1 | — | 0 | ○ | ○ | ○ | ○ |
| Ex. 368 | Bal. | 3 | 0.5 | 24 | 150 | 50 | 150 | | | | 422 | 111.0 | — | 0 | ○ | ○ | ○ | ○ |
| Ex. 369 | Bal. | 3 | 0.5 | 24 | 123 | 0 | 123 | | | | 318 | 158.5 | — | 0 | ○ | ○ | ○ | ○ |
| Ex. 370 | Bal. | 3 | 0.5 | 24 | 0 | 123 | 123 | | | | 318 | 158.5 | — | 0 | ○ | ○ | ○ | ○ |
| Ex. 371 | Bal. | 3 | 0.5 | 24 | 150 | 300 | 150 | | | | 672 | 49.3 | — | 0 | ○ | ○ | ○ | ○ |
| Ex. 372 | Bal. | 3 | 0.5 | 24 | 300 | 300 | 300 | | | | 972 | 62.0 | — | 0 | ○ | ○ | ○ | ○ |
| Ex. 373 | Bal. | 3 | 0.5 | 24 | 300 | 1000 | 1000 | | | | 2372 | 82.5 | — | 0 | ○ | ○ | ○ | ○ |
| Ex. 374 | Bal. | 3 | 0.5 | 24 | 1000 | 300 | 1000 | | | | 2372 | 82.5 | — | 0 | ○ | ○ | ○ | ○ |
| Ex. 375 | Bal. | 3 | 0.5 | 24 | 1000 | 1000 | 1000 | | | | 3072 | 53.6 | — | 0 | ○ | ○ | ○ | ○ |
| Ex. 376 | Bal. | 3 | 0.5 | 24 | 10000 | 5100 | 3000 | | | | 18172 | 20.3 | — | 0 | ○ | ○ | ○ | ○ |
| R. Ex. 377 | Bal. | 3 | 0.5 | 24 | 10000 | 5100 | 0 | | | | 15172 | 0.5 | — | 0 | ○ | ○ | ○ | ○ |
| Ex. 378 | Bal. | 3 | 0.5 | 24 | 10000 | 0 | 1000 | | | | 11072 | 10.7 | — | 0 | ○ | ○ | ○ | ○ |

(Ex.: Example, R. Ex: Referential Example)

TABLE 15

| | Alloy constitution | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | (As, Bi, Pb, Sb: ppm by mass, Ag, Cu: % by mass) | | | | | | | | | | | | | | Change over time | ΔT | Wetta-bility | Total evalu-ation |
| | Sn | Ag | Cu | As | Bi | Pb | Sb | Ni | Fe | In | | | | | | | | |
| Ex. 379 | Bal. | 3 | 0.5 | 24 | 0 | 5100 | 1000 | | | | 8172 | 21.0 | — | 0 | ○ | ○ | ○ | ○ |
| Ex. 380 | Bal. | 3 | 0.5 | 24 | 150 | 300 | 150 | | | | 672 | 49.3 | — | 0 | ○ | ○ | ○ | ○ |
| R. Ex. 381 | Bal. | 3 | 0.5 | 38 | 82 | 82 | 82 | | | | 360 | 119.5 | — | 0 | ○ | ○ | ○ | ○ |
| R. Ex. 382 | Bal. | 3 | 0.5 | 38 | 50 | 150 | 150 | | | | 464 | 132.0 | — | 0 | ○ | ○ | ○ | ○ |
| R. Ex. 383 | Bal. | 3 | 0.5 | 38 | 150 | 300 | 50 | | | | 614 | 36.4 | — | 0 | ○ | ○ | ○ | ○ |
| R. Ex. 384 | Bal. | 3 | 0.5 | 38 | 150 | 50 | 150 | | | | 464 | 132.0 | — | 0 | ○ | ○ | ○ | ○ |
| R. Ex. 385 | Bal. | 3 | 0.5 | 38 | 123 | 0 | 123 | | | | 360 | 192.7 | — | 0 | ○ | ○ | ○ | ○ |
| R. Ex. 386 | Bal. | 3 | 0.5 | 38 | 0 | 123 | 123 | | | | 360 | 192.7 | — | 0 | ○ | ○ | ○ | ○ |
| R. Ex. 387 | Bal. | 3 | 0.5 | 38 | 150 | 300 | 150 | | | | 714 | 58.7 | — | 0 | ○ | ○ | ○ | ○ |
| R. Ex. 388 | Bal. | 3 | 0.5 | 38 | 300 | 300 | 300 | | | | 1014 | 69.0 | — | 0 | ○ | ○ | ○ | ○ |
| R. Ex. 389 | Bal. | 3 | 0.5 | 38 | 300 | 1000 | 1000 | | | | 2414 | 85.7 | — | 0 | ○ | ○ | ○ | ○ |
| R. Ex. 390 | Bal. | 3 | 0.5 | 38 | 1000 | 300 | 1000 | | | | 2414 | 85.7 | — | 0 | ○ | ○ | ○ | ○ |
| R. Ex. 391 | Bal. | 3 | 0.5 | 38 | 1000 | 1000 | 1000 | | | | 3114 | 55.7 | — | 0 | ○ | ○ | ○ | ○ |
| R. Ex. 392 | Bal. | 3 | 0.5 | 38 | 10000 | 5100 | 3000 | | | | 18214 | 20.6 | — | 0 | ○ | ○ | ○ | ○ |
| R. Ex. 393 | Bal. | 3 | 0.5 | 38 | 10000 | 5100 | 0 | | | | 15214 | 0.8 | — | 0 | ○ | ○ | ○ | ○ |
| R. Ex. 394 | Bal. | 3 | 0.5 | 38 | 10000 | 0 | 1000 | | | | 11114 | 11.1 | — | 0 | ○ | ○ | ○ | ○ |
| R. Ex. 395 | Bal. | 3 | 0.5 | 38 | 0 | 5100 | 1000 | | | | 8214 | 21.8 | — | 0 | ○ | ○ | ○ | ○ |
| R. Ex. 396 | Bal. | 3 | 0.5 | 38 | 150 | 300 | 150 | | | | 714 | 58.7 | — | 0 | ○ | ○ | ○ | ○ |
| Ex. 397 | Bal. | 3 | 0.5 | 18 | 150 | 300 | 150 | 40 | | | 654 | 45.3 | — | 40 | ○ | ○ | ○ | ○ |
| Ex. 398 | Bal. | 3 | 0.5 | 18 | 150 | 300 | 150 | 100 | | | 654 | 45.3 | — | 100 | ○ | ○ | ○ | ○ |
| Ex. 399 | Bal. | 3 | 0.5 | 18 | 150 | 300 | 150 | 500 | | | 654 | 45.3 | — | 500 | ○ | ○ | ○ | ○ |
| Ex. 400 | Bal. | 3 | 0.5 | 18 | 150 | 300 | 150 | 600 | | | 654 | 45.3 | — | 600 | ○ | ○ | ○ | ○ |
| Ex. 401 | Bal. | 3 | 0.5 | 18 | 150 | 300 | 150 | | 20 | | 654 | 45.3 | 0 | 20 | ○ | ○ | ○ | ○ |
| Ex. 402 | Bal. | 3 | 0.5 | 18 | 150 | 300 | 150 | | 100 | | 654 | 45.3 | 0 | 100 | ○ | ○ | ○ | ○ |
| Ex. 403 | Bal. | 3 | 0.5 | 18 | 150 | 300 | 150 | 40 | 20 | | 654 | 45.3 | 2 | 60 | ○ | ○ | ○ | ○ |
| Ex. 404 | Bal. | 3 | 0.5 | 18 | 150 | 300 | 150 | 40 | 10 | | 654 | 45.3 | 4 | 50 | ○ | ○ | ○ | ○ |
| Ex. 405 | Bal. | 3 | 0.5 | 18 | 150 | 300 | 150 | 80 | 10 | | 654 | 45.3 | 8 | 90 | ○ | ○ | ○ | ○ |

(Ex.: Example, R. Ex: Referential Example)

TABLE 16

| | Alloy constitution | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | (As, Bi, Pb, Sb: ppm by mass, Ag, Cu: % by mass) | | | | | | | | | | | | | | Change over time | ΔT | Wetta-bility | Total evalu-ation |
| | Sn | Ag | Cu | As | Bi | Pb | Sb | Ni | Fe | In | | | | | | | | |
| Ex. 406 | Bal. | 3 | 0.5 | 18 | 150 | 300 | 150 | 500 | 10 | | 654 | 45.3 | 50 | 510 | ○ | ○ | ○ | ○ |
| Ex. 407 | Bal. | 3 | 0.5 | 18 | 150 | 300 | 150 | 10 | 100 | | 654 | 45.3 | 0.1 | 110 | ○ | ○ | ○ | ○ |
| Ex. 408 | Bal. | 3 | 0.5 | 18 | 150 | 300 | 150 | 100 | 100 | | 654 | 45.3 | 1 | 200 | ○ | ○ | ○ | ○ |
| Ex. 409 | Bal. | 3 | 0.5 | 18 | 150 | 300 | 150 | 600 | 80 | | 654 | 45.3 | 7.5 | 680 | ○ | ○ | ○ | ○ |
| Ex. 410 | Bal. | 3 | 0.5 | 18 | 150 | 300 | 150 | | | 20 | 654 | 45.3 | — | 0 | ○ | ○ | ○ | ○ |
| Ex. 411 | Bal. | 3 | 0.5 | 18 | 150 | 300 | 150 | | | 100 | 654 | 45.3 | — | 0 | ○ | ○ | ○ | ○ |
| Ex. 412 | Bal. | 3 | 0.5 | 18 | 150 | 300 | 150 | | | 1200 | 654 | 45.3 | — | 0 | ○ | ○ | ○ | ○ |
| Ex. 413 | Bal. | 3 | 0.5 | 18 | 150 | 300 | 150 | 40 | 20 | 20 | 654 | 45.3 | 2 | 60 | ○ | ○ | ○ | ○ |
| Ex. 414 | Bal. | 3 | 0.5 | 18 | 150 | 300 | 150 | 100 | 50 | 50 | 654 | 45.3 | 2 | 150 | ○ | ○ | ○ | ○ |
| Ex. 415 | Bal. | 3 | 0.5 | 18 | 150 | 300 | 150 | 500 | 50 | 30 | 654 | 45.3 | 10 | 550 | ○ | ○ | ○ | ○ |
| Ex. 416 | Bal. | 3.5 | 0.5 | 18 | 82 | 82 | 82 | | | | 300 | 82.9 | — | 0 | ○ | ○ | ○ | ○ |
| Ex. 417 | Bal. | 3.5 | 0.5 | 18 | 50 | 150 | 150 | | | | 404 | 102.0 | — | 0 | ○ | ○ | ○ | ○ |
| Ex. 418 | Bal. | 3.5 | 0.5 | 18 | 150 | 300 | 50 | | | | 554 | 23.1 | — | 0 | ○ | ○ | ○ | ○ |
| Ex. 419 | Bal. | 3.5 | 0.5 | 18 | 150 | 50 | 150 | | | | 404 | 102.0 | — | 0 | ○ | ○ | ○ | ○ |
| Ex. 420 | Bal. | 3.5 | 0.5 | 18 | 123 | 0 | 123 | | | | 300 | 143.9 | — | 0 | ○ | ○ | ○ | ○ |
| Ex. 421 | Bal. | 3.5 | 0.5 | 18 | 0 | 123 | 123 | | | | 300 | 143.9 | — | 0 | ○ | ○ | ○ | ○ |
| Ex. 422 | Bal. | 3.5 | 0.5 | 18 | 150 | 300 | 150 | | | | 654 | 45.3 | — | 0 | ○ | ○ | ○ | ○ |
| Ex. 423 | Bal. | 3.5 | 0.5 | 18 | 300 | 300 | 300 | | | | 954 | 59.0 | — | 0 | ○ | ○ | ○ | ○ |
| Ex. 424 | Bal. | 3.5 | 0.5 | 18 | 300 | 1000 | 1000 | | | | 2354 | 81.1 | — | 0 | ○ | ○ | ○ | ○ |
| Ex. 425 | Bal. | 3.5 | 0.5 | 18 | 1000 | 300 | 1000 | | | | 2354 | 81.1 | — | 0 | ○ | ○ | ○ | ○ |
| Ex. 426 | Bal. | 3.5 | 0.5 | 18 | 1000 | 1000 | 1000 | | | | 3054 | 52.7 | — | 0 | ○ | ○ | ○ | ○ |
| Ex. 427 | Bal. | 3.5 | 0.5 | 10 | 10000 | 5100 | 3000 | | | | 18130 | 20.1 | — | 0 | ○ | ○ | ○ | ○ |
| R. Ex. 428 | Bal. | 3.5 | 0.5 | 10 | 10000 | 5100 | 0 | | | | 15130 | 0.2 | — | 0 | ○ | ○ | ○ | ○ |
| Ex. 429 | Bal. | 3.5 | 0.5 | 10 | 10000 | 0 | 1000 | | | | 11030 | 10.3 | — | 0 | ○ | ○ | ○ | ○ |
| Ex. 430 | Bal. | 3.5 | 0.5 | 10 | 0 | 5100 | 1000 | | | | 6130 | 20.2 | — | 0 | ○ | ○ | ○ | ○ |
| Ex. 431 | Bal. | 3.5 | 0.5 | 10 | 150 | 300 | 150 | | | | 630 | 40.0 | — | 0 | ○ | ○ | ○ | ○ |
| Ex. 432 | Bal. | 3.5 | 0.5 | 14 | 86 | 86 | 86 | | | | 300 | 74.4 | — | 0 | ○ | ○ | ○ | ○ |

(Ex.: Example, R. Ex: Referential Example)

TABLE 17

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evaluation |
| Ex. 433 | Bal. | 3.5 | 0.5 | 14 | 50 | 150 | 150 | | | | 392 | 96.0 | — | 0 | ○ | ○ | ○ | ○ |
| Ex. 434 | Bal. | 3.5 | 0.5 | 14 | 150 | 300 | 50 | | | | 542 | 20.4 | — | 0 | ○ | ○ | ○ | ○ |
| Ex. 435 | Bal. | 3.5 | 0.5 | 14 | 150 | 50 | 150 | | | | 392 | 96.0 | — | 0 | ○ | ○ | ○ | ○ |
| Ex. 436 | Bal. | 3.5 | 0.5 | 14 | 200 | 0 | 200 | | | | 442 | 121.0 | — | 0 | ○ | ○ | ○ | ○ |
| Ex. 437 | Bal. | 3.5 | 0.5 | 14 | 0 | 200 | 200 | | | | 442 | 121.0 | — | 0 | ○ | ○ | ○ | ○ |
| Ex. 438 | Bal. | 3.5 | 0.5 | 14 | 150 | 300 | 150 | | | | 642 | 42.7 | — | 0 | ○ | ○ | ○ | ○ |
| Ex. 439 | Bal. | 3.5 | 0.5 | 14 | 300 | 300 | 300 | | | | 942 | 57.0 | — | 0 | ○ | ○ | ○ | ○ |
| Ex. 440 | Bal. | 3.5 | 0.5 | 14 | 300 | 1000 | 1000 | | | | 2342 | 80.2 | — | 0 | ○ | ○ | ○ | ○ |
| Ex. 441 | Bal. | 3.5 | 0.5 | 14 | 1000 | 300 | 1000 | | | | 2342 | 80.2 | — | 0 | ○ | ○ | ○ | ○ |
| Ex. 442 | Bal. | 3.5 | 0.5 | 14 | 1000 | 1000 | 1000 | | | | 3042 | 52.1 | — | 0 | ○ | ○ | ○ | ○ |
| Ex. 443 | Bal. | 3.5 | 0.5 | 14 | 10000 | 5100 | 3000 | | | | 18142 | 20.1 | — | 0 | ○ | ○ | ○ | ○ |
| R. Ex. 444 | Bal. | 3.5 | 0.5 | 14 | 10000 | 5100 | 0 | | | | 15142 | 0.3 | — | 0 | ○ | ○ | ○ | ○ |
| Ex. 445 | Bal. | 3.5 | 0.5 | 14 | 10000 | 0 | 1000 | | | | 11042 | 10.4 | — | 0 | ○ | ○ | ○ | ○ |
| Ex. 446 | Bal. | 3.5 | 0.5 | 14 | 0 | 5100 | 100 | | | | 6142 | 20.4 | — | 0 | ○ | ○ | ○ | ○ |
| Ex. 447 | Bal. | 3.5 | 0.5 | 14 | 150 | 300 | 150 | | | | 642 | 42.7 | — | 0 | ○ | ○ | ○ | ○ |
| Ex. 448 | Bal. | 3.5 | 0.5 | 24 | 82 | 82 | 82 | | | | 318 | 93.9 | — | 0 | ○ | ○ | ○ | ○ |
| Ex. 449 | Bal. | 3.5 | 0.5 | 24 | 50 | 150 | 150 | | | | 422 | 111.0 | — | 0 | ○ | ○ | ○ | ○ |
| Ex. 450 | Bal. | 3.5 | 0.5 | 24 | 150 | 300 | 50 | | | | 572 | 27.1 | — | 0 | ○ | ○ | ○ | ○ |
| Ex. 451 | Bal. | 3.5 | 0.5 | 24 | 150 | 50 | 150 | | | | 422 | 111.0 | — | 0 | ○ | ○ | ○ | ○ |
| Ex. 452 | Bal. | 3.5 | 0.5 | 24 | 123 | 0 | 123 | | | | 318 | 158.5 | — | 0 | ○ | ○ | ○ | ○ |
| Ex. 453 | Bal. | 3.5 | 0.5 | 24 | 0 | 123 | 123 | | | | 318 | 158.5 | — | 0 | ○ | ○ | ○ | ○ |
| Ex. 454 | Bal. | 3.5 | 0.5 | 24 | 150 | 300 | 150 | | | | 672 | 49.3 | — | 0 | ○ | ○ | ○ | ○ |
| Ex. 455 | Bal. | 3.5 | 0.5 | 24 | 300 | 300 | 300 | | | | 972 | 62.0 | — | 0 | ○ | ○ | ○ | ○ |
| Ex. 456 | Bal. | 3.5 | 0.5 | 24 | 300 | 1000 | 1000 | | | | 2372 | 82.5 | — | 0 | ○ | ○ | ○ | ○ |
| Ex. 457 | Bal. | 3.5 | 0.5 | 24 | 1000 | 300 | 1000 | | | | 2372 | 82.5 | — | 0 | ○ | ○ | ○ | ○ |
| Ex. 458 | Bal. | 3.5 | 0.5 | 24 | 1000 | 1000 | 1000 | | | | 3072 | 53.6 | — | 0 | ○ | ○ | ○ | ○ |
| Ex. 459 | Bal. | 3.5 | 0.5 | 24 | 10000 | 5100 | 3000 | | | | 18172 | 20.3 | — | 0 | ○ | ○ | ○ | ○ |

(Ex.: Example, R. Ex: Referential Example)

TABLE 18

| | Alloy constitution (As, Bi, Pb, Sb: ppm by mass, Ag, Cu: % by mass) | | | | | | | | | | Formula (1) | Formula (2) | Formula (3) | Formula (4) | Evaluation item | | | |
|---|---|---|---|---|---|---|---|---|---|---|---|---|---|---|---|---|---|---|
| | Sn | Ag | Cu | As | Bi | Pb | Sb | Ni | Fe | In | | | | | Change over time | ΔT | Wetta-bility | Total evaluation |
| R. Ex. 460 | Bal. | 3.5 | 0.5 | 24 | 10000 | 5100 | 0 | | | | 15172 | 0.5 | — | 0 | ○ | ○ | ○ | ○ |
| Ex. 461 | Bal. | 3.5 | 0.5 | 24 | 10000 | 0 | 1000 | | | | 11072 | 10.7 | — | 0 | ○ | ○ | ○ | ○ |
| Ex. 462 | Bal. | 3.5 | 0.5 | 24 | 0 | 5100 | 1000 | | | | 6172 | 21.0 | — | 0 | ○ | ○ | ○ | ○ |
| Ex. 463 | Bal. | 3.5 | 0.5 | 24 | 150 | 300 | 150 | | | | 672 | 49.3 | — | 0 | ○ | ○ | ○ | ○ |
| R. Ex. 464 | Bal. | 3.5 | 0.5 | 38 | 82 | 82 | 82 | | | | 360 | 119.5 | — | 0 | ○ | ○ | ○ | ○ |
| R. Ex. 465 | Bal. | 3.5 | 0.5 | 38 | 50 | 150 | 150 | | | | 464 | 132.0 | — | 0 | ○ | ○ | ○ | ○ |
| R. Ex. 466 | Bal. | 3.5 | 0.5 | 38 | 150 | 300 | 50 | | | | 514 | 36.4 | — | 0 | ○ | ○ | ○ | ○ |
| R. Ex. 467 | Bal. | 3.5 | 0.5 | 38 | 150 | 50 | 150 | | | | 464 | 132.0 | — | 0 | ○ | ○ | ○ | ○ |
| R. Ex. 468 | Bal. | 3.5 | 0.5 | 38 | 123 | 0 | 123 | | | | 360 | 192.7 | — | 0 | ○ | ○ | ○ | ○ |
| R. Ex. 469 | Bal. | 3.5 | 0.5 | 38 | 0 | 123 | 123 | | | | 360 | 192.7 | — | 0 | ○ | ○ | ○ | ○ |
| R. Ex. 470 | Bal. | 3.5 | 0.5 | 38 | 150 | 300 | 150 | | | | 714 | 58.7 | — | 0 | ○ | ○ | ○ | ○ |
| R. Ex. 471 | Bal. | 3.5 | 0.5 | 38 | 300 | 300 | 300 | | | | 1014 | 89.0 | — | 0 | ○ | ○ | ○ | ○ |
| R. Ex. 472 | Bal. | 3.5 | 0.5 | 38 | 300 | 1000 | 1000 | | | | 2414 | 85.7 | — | 0 | ○ | ○ | ○ | ○ |
| R. Ex. 473 | Bal. | 3.5 | 0.5 | 38 | 1000 | 300 | 1000 | | | | 2414 | 85.7 | — | 0 | ○ | ○ | ○ | ○ |
| R. Ex. 474 | Bal. | 3.5 | 0.5 | 38 | 1000 | 1000 | 1000 | | | | 3114 | 55.7 | — | 0 | ○ | ○ | ○ | ○ |
| R. Ex. 475 | Bal. | 3.5 | 0.5 | 38 | 10000 | 5100 | 3000 | | | | 18214 | 20.6 | — | 0 | ○ | ○ | ○ | ○ |
| R. Ex. 476 | Bal. | 3.5 | 0.5 | 38 | 10000 | 5100 | 0 | | | | 15214 | 0.8 | — | 0 | ○ | ○ | ○ | ○ |
| R. Ex. 477 | Bal. | 3.5 | 0.5 | 38 | 10000 | 0 | 1000 | | | | 11114 | 11.1 | — | 0 | ○ | ○ | ○ | ○ |
| R. Ex. 478 | Bal. | 3.5 | 0.5 | 38 | 0 | 5100 | 1000 | | | | 8214 | 21.8 | — | 0 | ○ | ○ | ○ | ○ |
| R. Ex. 479 | Bal. | 3.5 | 0.5 | 38 | 150 | 300 | 150 | | | | 714 | 58.7 | — | 0 | ○ | ○ | ○ | ○ |
| Ex. 480 | Bal. | 3.5 | 0.5 | 18 | 150 | 300 | 150 | 40 | | | 654 | 45.3 | — | 40 | ○ | ○ | ○ | ○ |
| Ex. 481 | Bal. | 3.5 | 0.5 | 18 | 150 | 300 | 150 | 100 | | | 654 | 45.3 | — | 100 | ○ | ○ | ○ | ○ |
| Ex. 482 | Bal. | 3.5 | 0.5 | 18 | 150 | 300 | 150 | 500 | | | 654 | 45.3 | — | 500 | ○ | ○ | ○ | ○ |
| Ex. 483 | Bal. | 3.5 | 0.5 | 18 | 150 | 300 | 150 | 600 | | | 654 | 45.3 | — | 600 | ○ | ○ | ○ | ○ |
| Ex. 484 | Bal. | 3.5 | 0.5 | 18 | 150 | 300 | 150 | | 20 | | 654 | 45.3 | 0 | 20 | ○ | ○ | ○ | ○ |
| Ex. 485 | Bal. | 3.5 | 0.5 | 18 | 150 | 300 | 150 | | 100 | | 654 | 45.3 | 0 | 100 | ○ | ○ | ○ | ○ |
| Ex. 486 | Bal. | 3.5 | 0.5 | 18 | 150 | 300 | 150 | 40 | 20 | | 654 | 45.3 | 2 | 60 | ○ | ○ | ○ | ○ |

(Ex.: Example, R. Ex: Referential Example)

TABLE 19

| | | Alloy constitution | | | | | | | | | | | | | Evaluation item | | | |
|---|---|---|---|---|---|---|---|---|---|---|---|---|---|---|---|---|---|---|
| | | | | (As, Bi, Pb, Sb: ppm by mass, Ag, Cu: % by mass) | | | | | | | Formula (1) | Formula (2) | Formula (3) | Formula (4) | Change over time | ΔT | Wetta-bility | Total evalu-ation |
| | Sn | Ag | Cu | As | Bi | Pb | Sb | Ni | Fe | In | | | | | | | | |
| Ex. 487 | Bal. | 3.5 | 0.5 | 18 | 150 | 300 | 150 | 40 | 10 | | 654 | 45.3 | 4 | 50 | ○ | ○ | ○ | ○ |
| Ex. 488 | Bal. | 3.5 | 0.5 | 18 | 150 | 300 | 150 | 80 | 10 | | 654 | 45.3 | 8 | 90 | ○ | ○ | ○ | ○ |
| Ex. 489 | Bal. | 3.5 | 0.5 | 18 | 150 | 300 | 150 | 500 | 10 | | 654 | 45.3 | 50 | 510 | ○ | ○ | ○ | ○ |
| Ex. 490 | Bal. | 3.5 | 0.5 | 18 | 150 | 300 | 150 | 10 | 100 | | 654 | 45.3 | 0.1 | 110 | ○ | ○ | ○ | ○ |
| Ex. 491 | Bal. | 3.5 | 0.5 | 18 | 150 | 300 | 150 | 100 | 100 | | 654 | 45.3 | 1 | 200 | ○ | ○ | ○ | ○ |
| Ex. 492 | Bal. | 3.5 | 0.5 | 18 | 150 | 300 | 150 | 800 | 80 | | 654 | 45.3 | 7.5 | 680 | ○ | ○ | ○ | ○ |
| Ex. 493 | Bal. | 3.5 | 0.5 | 18 | 150 | 300 | 150 | | | 20 | 654 | 45.3 | — | 0 | ○ | ○ | ○ | ○ |
| Ex. 494 | Bal. | 3.5 | 0.5 | 18 | 150 | 300 | 150 | | | 100 | 654 | 45.3 | — | 0 | ○ | ○ | ○ | ○ |
| Ex. 495 | Bal. | 3.5 | 0.5 | 18 | 150 | 300 | 150 | | | 1200 | 654 | 45.3 | — | 0 | ○ | ○ | ○ | ○ |
| Ex. 496 | Bal. | 3.5 | 0.5 | 18 | 150 | 300 | 150 | 40 | 20 | 20 | 654 | 45.3 | 2 | 60 | ○ | ○ | ○ | ○ |
| Ex. 497 | Bal. | 3.5 | 0.5 | 18 | 150 | 300 | 150 | 100 | 50 | 30 | 654 | 45.3 | 2 | 150 | ○ | ○ | ○ | ○ |
| Ex. 498 | Bal. | 3.5 | 0.5 | 18 | 150 | 300 | 150 | 500 | 50 | 30 | 654 | 45.3 | 10 | 550 | ○ | ○ | ○ | ○ |
| C. Ex. 1 | Bal. | | | 0 | 100 | 100 | 100 | | | | 300 | 50.0 | — | 0 | x | ○ | ○ | x |
| C. Ex. 2 | Bal. | | | 18 | 25 | 25 | 25 | | | | 129 | 158.0 | — | 0 | x | ○ | ○ | x |
| C. Ex. 3 | Bal. | | | 300 | 50 | 50 | 500 | | | | 1500 | 1400.0 | — | 0 | ○ | ○ | x | x |
| C. Ex. 4 | Bal. | | | 350 | 25 | 25 | 1150 | | | | 2250 | 4400.0 | — | 0 | ○ | ○ | x | x |
| C. Ex. 5 | Bal. | | | 800 | 100 | 100 | 800 | | | | 3400 | 1600.0 | — | 0 | ○ | ○ | x | x |
| C. Ex. 6 | Bal. | | | 250 | 1 | 0 | 4800 | | | | 5551 | 555000.0 | — | 0 | ○ | ○ | x | x |
| C. Ex. 7 | Bal. | | | 800 | 100 | 100 | 3500 | | | | 6100 | 2950.0 | — | 0 | ○ | ○ | x | x |
| C. Ex. 8 | Bal. | | | 18 | 1 | 0 | 10000 | | | | 10055 | 1005400.0 | — | 0 | ○ | ○ | x | x |
| C. Ex. 9 | Bal. | | | 18 | 25000 | 25000 | 100 | | | | 50154 | 0.3 | — | 0 | ○ | x | ○ | x |
| C. Ex. 10 | Bal. | | | 18 | 50000 | 0 | 100 | | | | 50154 | 0.3 | — | 0 | ○ | x | ○ | x |
| C. Ex. 11 | Bal. | | | 18 | 0 | 50000 | 100 | | | | 50154 | 0.3 | — | 0 | ○ | x | ○ | x |
| C. Ex. 12 | Bal. | | | 300 | 0 | 0 | 3000 | | | | 3900 | — | — | 0 | ○ | ○ | x | x |
| C. Ex. 13 | Bal. | | | 100 | 100 | 25000 | 0 | | | | 25400 | 1.2 | — | 0 | ○ | x | ○ | x |
| C. Ex. 14 | Bal. | | 0.7 | 0 | 100 | 100 | 100 | | | | 300 | 50.0 | — | 0 | x | ○ | ○ | x |
| C. Ex. 15 | Bal. | | 0.7 | 18 | 25 | 25 | 25 | | | | 129 | 158.0 | — | 0 | x | ○ | ○ | x |

(Ex.: Example, C. Ex.: Comparative Example)

TABLE 20

| | | Alloy constitution | | | | | | | | | | | | | Evaluation item | | | |
|---|---|---|---|---|---|---|---|---|---|---|---|---|---|---|---|---|---|---|
| | | | | (As, Bi, Pb, Sb: ppm by mass, Ag, Cu: % by mass) | | | | | | | Formula (1) | Formula (2) | Formula (3) | Formula (4) | Change over time | ΔT | Wetta-bility | Total evalu-ation |
| | Sn | Ag | Cu | As | Bi | Pb | Sb | Ni | Fe | In | | | | | | | | |
| C. Ex. 16 | Bal. | | 0.7 | 300 | 50 | 50 | 500 | | | | 1500 | 1400.0 | — | 0 | ○ | ○ | x | x |
| C. Ex. 17 | Bal. | | 0.7 | 350 | 25 | 25 | 1150 | | | | 2250 | 4400.0 | — | 0 | ○ | ○ | x | x |
| C. Ex. 18 | Bal. | | 0.7 | 800 | 100 | 100 | 800 | | | | 3400 | 1600.0 | — | 0 | ○ | ○ | x | x |
| C. Ex. 19 | Bal. | | 0.7 | 250 | 1 | 0 | 4800 | | | | 5551 | 555000.0 | — | 0 | ○ | ○ | x | x |
| C. Ex. 20 | Bal. | | 0.7 | 800 | 100 | 100 | 3500 | | | | 6100 | 2950.0 | — | 0 | ○ | ○ | x | x |
| C. Ex. 21 | Bal. | | 0.7 | 18 | 1 | 0 | 10000 | | | | 10055 | 1005400.0 | — | 0 | ○ | ○ | x | x |
| C. Ex. 22 | Bal. | | 0.7 | 18 | 25000 | 25000 | 100 | | | | 50154 | 0.3 | — | 0 | ○ | x | ○ | x |
| C. Ex. 23 | Bal. | | 0.7 | 18 | 50000 | 0 | 100 | | | | 50154 | 0.3 | — | 0 | ○ | x | ○ | x |
| C. Ex. 24 | Bal. | | 0.7 | 18 | 0 | 50000 | 100 | | | | 50154 | 0.3 | — | 0 | ○ | x | ○ | x |
| C. Ex. 25 | Bal. | | 0.7 | 300 | 0 | 0 | 3000 | | | | 3900 | — | — | 0 | ○ | ○ | x | x |
| C. Ex. 26 | Bal. | | 0.7 | 100 | 100 | 25000 | 0 | | | | 25400 | 1.2 | — | 0 | ○ | x | ○ | x |
| C. Ex. 27 | Bal. | 1 | 0.5 | 0 | 100 | 100 | 100 | | | | 300 | 50.0 | — | 0 | x | ○ | ○ | x |
| C. Ex. 28 | Bal. | 1 | 0.5 | 18 | 25 | 25 | 25 | | | | 129 | 158.0 | — | 0 | x | ○ | ○ | x |
| C. Ex. 29 | Bal. | 1 | 0.5 | 300 | 50 | 50 | 500 | | | | 1500 | 1400.0 | — | 0 | ○ | ○ | x | x |
| C. Ex. 30 | Bal. | 1 | 0.5 | 350 | 25 | 25 | 1150 | | | | 2250 | 4400.0 | — | 0 | ○ | ○ | x | x |
| C. Ex. 31 | Bal. | 1 | 0.5 | 600 | 100 | 100 | 800 | | | | 3400 | 1600.0 | — | 0 | ○ | ○ | x | x |
| C. Ex. 32 | Bal. | 1 | 0.5 | 250 | 1 | 0 | 4800 | | | | 5551 | 555000.0 | — | 0 | ○ | ○ | x | x |
| C. Ex. 33 | Bal. | 1 | 0.5 | 800 | 100 | 100 | 3500 | | | | 6100 | 2950.0 | — | 0 | ○ | ○ | x | x |
| C. Ex. 34 | Bal. | 1 | 0.5 | 18 | 1 | 0 | 1000 | | | | 10055 | 1005400.0 | — | 0 | ○ | ○ | x | x |
| C. Ex. 35 | Bal. | 1 | 0.5 | 18 | 25000 | 25000 | 100 | | | | 50154 | 0.3 | — | 0 | ○ | x | ○ | x |
| C. Ex. 36 | Bal. | 1 | 0.5 | 18 | 50000 | 0 | 100 | | | | 50154 | 0.3 | — | 0 | ○ | x | ○ | x |
| C. Ex. 37 | Bal. | 1 | 0.5 | 18 | 0 | 50000 | 100 | | | | 50154 | 0.3 | — | 0 | ○ | x | ○ | x |
| C. Ex. 38 | Bal. | 1 | 0.5 | 300 | 0 | 0 | 3000 | | | | 3900 | — | — | 0 | ○ | ○ | x | x |
| C. Ex. 39 | Bal. | 1 | 0.5 | 100 | 100 | 25000 | 0 | | | | 25400 | 1.2 | — | 0 | ○ | x | ○ | x |
| C. Ex. 40 | Bal. | 2 | 0.5 | 0 | 100 | 100 | 100 | | | | 300 | 50.0 | — | 0 | x | ○ | ○ | x |
| C. Ex. 41 | Bal. | 2 | 0.5 | 18 | 25 | 25 | 25 | | | | 129 | 158.0 | — | 0 | x | ○ | ○ | x |
| C. Ex. 42 | Bal. | 2 | 0.5 | 300 | 50 | 50 | 500 | | | | 1500 | 1400.0 | — | 0 | ○ | ○ | x | x |

(C. Ex.: Comparative Example)

TABLE 21

| | Alloy constitution | | | | | | | | | | | | | | Evaluation item | | |
|---|---|---|---|---|---|---|---|---|---|---|---|---|---|---|---|---|---|
| | | | | (As, Bi, Pb, Sb: ppm by mass, Ag, Cu: % by mass) | | | | | | Formula | Formula | Formula | Formula | Change over | | Wetta- | Total evalu- |
| | Sn | Ag | Cu | As | Bi | Pb | Sb | Ni | Fe | In | (1) | (2) | (3) | (4) | time | ΔT | bility | ation |
| C. Ex. 43 | Bal. | 2 | 0.5 | 350 | 25 | 25 | 1150 | | | | 2250 | 4400.0 | — | 0 | ○ | ○ | x | x |
| C. Ex. 44 | Bal. | 2 | 0.5 | 800 | 100 | 100 | 800 | | | | 3400 | 1600.0 | — | 0 | ○ | ○ | x | x |
| C. Ex. 45 | Bal. | 2 | 0.5 | 250 | 1 | 0 | 4800 | | | | 5551 | 555000.0 | — | 0 | ○ | ○ | x | x |
| C. Ex. 46 | Bal. | 2 | 0.5 | 800 | 100 | 100 | 3500 | | | | 6100 | 2950.0 | — | 0 | ○ | ○ | x | x |
| C. Ex. 47 | Bal. | 2 | 0.5 | 18 | 1 | 0 | 10000 | | | | 10055 | 1005400.0 | — | 0 | ○ | ○ | x | x |
| C. Ex. 48 | Bal. | 2 | 0.5 | 18 | 25000 | 25000 | 100 | | | | 50154 | 0.3 | — | 0 | ○ | x | ○ | x |
| C. Ex. 49 | Bal. | 2 | 0.5 | 18 | 50000 | 0 | 100 | | | | 50154 | 0.3 | — | 0 | ○ | x | ○ | x |
| C. Ex. 50 | Bal. | 2 | 0.5 | 18 | 0 | 50000 | 100 | | | | 50154 | 0.3 | — | 0 | ○ | x | ○ | x |
| C. Ex. 51 | Bal. | 2 | 0.5 | 300 | 0 | 0 | 3000 | | | | 3900 | — | — | 0 | ○ | ○ | x | x |
| C. Ex. 52 | Bal. | 2 | 0.5 | 100 | 100 | 25000 | 0 | | | | 25400 | 1.2 | — | 0 | ○ | x | ○ | x |
| C. Ex. 53 | Bal. | 3 | 0.5 | 0 | 100 | 100 | 100 | | | | 300 | 50.0 | — | 0 | x | ○ | ○ | x |
| C. Ex. 54 | Bal. | 3 | 0.5 | 18 | 25 | 25 | 25 | | | | 129 | 158.0 | — | 0 | x | ○ | ○ | x |
| C. Ex. 55 | Bal. | 3 | 0.5 | 300 | 50 | 50 | 500 | | | | 1500 | 1400.0 | — | 0 | ○ | ○ | x | x |
| C. Ex. 56 | Bal. | 3 | 0.5 | 350 | 25 | 25 | 1150 | | | | 2250 | 4400.0 | — | 0 | ○ | ○ | x | x |
| C. Ex. 57 | Bal. | 3 | 0.5 | 800 | 100 | 100 | 800 | | | | 3400 | 1600.0 | — | 0 | ○ | ○ | x | x |
| C. Ex. 58 | Bal. | 3 | 0.5 | 250 | 1 | 0 | 4800 | | | | 5551 | 555000.0 | — | 0 | ○ | ○ | x | x |
| C. Ex. 59 | Bal. | 3 | 0.5 | 800 | 100 | 100 | 3500 | | | | 6100 | 2950.0 | — | 0 | ○ | ○ | x | x |
| C. Ex. 60 | Bal. | 3 | 0.5 | 18 | 1 | 0 | 10000 | | | | 10055 | 1005400.0 | — | 0 | ○ | ○ | x | x |
| C. Ex. 61 | Bal. | 3 | 0.5 | 18 | 25000 | 25000 | 100 | | | | 50154 | 0.3 | — | 0 | ○ | x | ○ | x |
| C. Ex. 62 | Bal. | 3 | 0.5 | 18 | 50000 | 0 | 100 | | | | 50154 | 0.3 | — | 0 | ○ | x | ○ | x |
| C. Ex. 63 | Bal. | 3 | 0.5 | 18 | 0 | 50000 | 100 | | | | 50154 | 0.3 | — | 0 | ○ | x | ○ | x |
| C. Ex. 64 | Bal. | 3 | 0.5 | 300 | 0 | 0 | 3000 | | | | 3900 | — | — | 0 | ○ | ○ | x | x |
| C. Ex. 65 | Bal. | 3 | 0.5 | 100 | 100 | 25000 | 0 | | | | 25400 | 1.2 | — | 0 | ○ | x | ○ | x |
| C. Ex. 66 | Bal. | 3.5 | 0.5 | 0 | 100 | 100 | 100 | | | | 300 | 50.0 | — | 0 | x | ○ | ○ | x |
| C. Ex. 67 | Bal. | 3.5 | 0.5 | 18 | 25 | 25 | 25 | | | | 129 | 158.0 | — | 0 | x | ○ | ○ | x |
| C. Ex. 68 | Bal. | 3.5 | 0.5 | 300 | 50 | 50 | 500 | | | | 1500 | 1400.0 | — | 0 | ○ | ○ | x | x |
| C. Ex. 69 | Bal. | 3.5 | 0.5 | 350 | 25 | 25 | 1150 | | | | 2250 | 4400.0 | — | 0 | ○ | ○ | x | x |

(C. Ex.: Comparative Example)

TABLE 22

| | Alloy constitution | | | | | | | | | | | | | | Evaluation item | | |
|---|---|---|---|---|---|---|---|---|---|---|---|---|---|---|---|---|---|
| | | | | (As, Bi, Pb, Sb: ppm by mass, Ag, Cu: % by mass) | | | | | | Formula | Formula | Formula | Formula | Change over | | Wetta- | Total evalu- |
| | Sn | Ag | Cu | As | Bi | Pb | Sb | Ni | Fe | In | (1) | (2) | (3) | (4) | time | ΔT | bility | ation |
| C. Ex. 70 | Bal. | 3.5 | 0.5 | 800 | 100 | 100 | 800 | | | | 3400 | 1600.0 | — | 0 | ○ | ○ | x | x |
| C. Ex. 71 | Bal. | 3.5 | 0.5 | 250 | 1 | 0 | 4800 | | | | 5551 | 555000.0 | — | 0 | ○ | ○ | x | x |
| C. Ex. 72 | Bal. | 3.5 | 0.5 | 800 | 100 | 100 | 3500 | | | | 6100 | 2950.0 | — | 0 | ○ | ○ | x | x |
| C. Ex. 73 | Bal. | 3.5 | 0.5 | 18 | 1 | 0 | 10000 | | | | 10055 | 1005400.0 | — | 0 | ○ | ○ | x | x |
| C. Ex. 74 | Bal. | 3.5 | 0.5 | 18 | 25000 | 25000 | 100 | | | | 50154 | 0.3 | — | 0 | ○ | x | ○ | x |
| C. Ex. 75 | Bal. | 3.5 | 0.5 | 18 | 50000 | 0 | 100 | | | | 50154 | 0.3 | — | 0 | ○ | x | ○ | x |
| C. Ex. 76 | Bal. | 3.5 | 0.5 | 18 | 0 | 50000 | 100 | | | | 50154 | 0.3 | — | 0 | ○ | x | ○ | x |
| C. Ex. 77 | Bal. | 3.5 | 0.5 | 300 | 0 | 0 | 3000 | | | | 3900 | — | — | 0 | ○ | ○ | x | x |
| C. Ex. 78 | Bal. | 3.5 | 0.5 | 100 | 100 | 25000 | 0 | | | | 25400 | 1.2 | — | 0 | ○ | x | ○ | x |

(C. Ex.: Comparative Example)

In the tables, the underlined portions were outside the scope of the present invention.

As shown in Tables 1 to 22, it was confirmed that the viscosity-increase suppression effect, the narrowing in the ΔT, and excellent wettability were exhibited in all examples in which all alloy constitutions satisfy the requirements of the present invention. In contrast, it was confirmed that at least one of the viscosity-increase suppression effect, the narrowing in the ΔT, and the wettability was deteriorated in comparative examples 1 to 78 in which all alloy constitutions do not satisfy at least one requirement of the present invention.

The invention claimed is:

1. A solder alloy characterized by having an alloy constitution consisting of: 10 ppm by mass to 18 ppm by mass of As; 82 ppm by mass to 300 ppm by mass of Bi; 0 ppm by mass to 5100 ppm by mass of Pb; more than 0 ppm by mass and no more than 3000 ppm by mass of Sb; 0 ppm by mass to 600 ppm by mass of Ni; 0 ppm by mass to 100 ppm by mass of Fe; 0 ppm by mass to 1200 ppm by mass of In; at least one selected from the group consisting of 0% by mass to 4% by mass of Ag and 0% by mass to 0.9% by mass of Cu; and a remaining amount of Sn, wherein both a formula (1) and a formula (2) are satisfied:

$$300 \leq 3As + Sb + Bi + Pb \leq 2372 \quad (1)$$

$$20.4 \leq \{(3As + Sb)/(Bi + Pb)\} \times 100 \leq 158.5 \quad (2)$$

in the formula (1) and the formula (2), As, Sb, Bi, and Pb each represents an amount thereof (ppm by mass) in the alloy constitution.

2. A solder alloy characterized by having an alloy constitution consisting of: 10 ppm by mass to 18 ppm by mass of As; 82 ppm by mass to 300 ppm by mass of Bi; more than 0 ppm by mass and no more than 5100 ppm by mass of Pb; more than 0 ppm by mass and no more than 3000 ppm by mass of Sb; 0 ppm by mass to 600 ppm by mass of Ni; 0 ppm by mass to 100 ppm by mass of Fe; 0 ppm by mass to 1200 ppm by mass of In; at least one selected from the group consisting of 0% by mass to 4% by mass of Ag and 0% by mass to 0.9% by mass of Cu; and a remaining amount of Sn, wherein both a formula (1) and a formula (2) are satisfied:

$$300 \leq 3As+Sb+Bi+Pb \leq 2372 \quad (1)$$

$$20.4 \leq \{(3As+Sb)/(Bi+Pb)\} \times 100 \leq 158.5 \quad (2)$$

in the formula (1) and the formula (2), As, Sb, Bi, and Pb each represents an amount thereof (ppm by mass) in the alloy constitution.

3. A solder alloy characterized by having an alloy constitution consisting of: 10 ppm by mass to 18 ppm by mass of As; 82 ppm by mass to 300 ppm by mass of Bi; 50 ppm by mass to 5100 ppm by mass of Pb; more than 0 ppm by mass and no more than 3000 ppm by mass of Sb; 0 ppm by mass to 600 ppm by mass of Ni; 0 ppm by mass to 100 ppm by mass of Fe; 0 ppm by mass to 1200 ppm by mass of In; at least one selected from the group consisting of 0% by mass to 4% by mass of Ag and 0% by mass to 0.9% by mass of Cu; and a remaining amount of Sn, wherein both a formula (1) and a formula (2) are satisfied:

$$300 \leq 3As+Sb+Bi+Pb \leq 2372 \quad (1)$$

$$20.4 \leq \{(3As+Sb)/(Bi+Pb)\} \times 100 \leq 111.0 \quad (2)$$

in the formula (1) and the formula (2), As, Sb, Bi, and Pb each represents an amount thereof (ppm by mass) in the alloy constitution.

4. A solder alloy characterized by having an alloy constitution consisting of comprising: 10 ppm by mass to 18 ppm by mass of As; 82 ppm by mass to 300 ppm by mass of Bi; more than 0 ppm by mass and no more than 5100 ppm by mass of Pb; 50 ppm by mass to 3000 ppm by mass of Sb; 0 ppm by mass to 600 ppm by mass of Ni; 0 ppm by mass to 100 ppm by mass of Fe; 0 ppm by mass to 1200 ppm by mass of In; at least one selected from the group consisting of 0% by mass to 4% by mass of Ag and 0% by mass to 0.9% by mass of Cu; and a remaining amount of Sn, wherein both a formula (1) and a formula (2) are satisfied:

$$300 \leq 3As+Sb+Bi+Pb \leq 2372 \quad (1)$$

$$20.4 \leq \{(3As+Sb)/(Bi+Pb)\} \times 100 \leq 158.5 \quad (2)$$

in the formula (1) and the formula (2), As, Sb, Bi, and Pb each represents an amount thereof (ppm by mass) in the alloy constitution.

5. A solder alloy characterized by having an alloy constitution consisting of comprising: 10 ppm by mass to 18 ppm by mass of As; 82 ppm by mass to 300 ppm by mass of Bi; 50 ppm by mass to 5100 ppm by mass of Pb; 50 ppm by mass to 3000 ppm by mass of Sb; 0 ppm by mass to 600 ppm by mass of Ni; 0 ppm by mass to 100 ppm by mass of Fe; 0 ppm by mass to 1200 ppm by mass of In; at least one selected from the group consisting of 0% by mass to 4% by mass of Ag and 0% by mass to 0.9% by mass of Cu; and a remaining amount of Sn, wherein both a formula (1) and a formula (2) are satisfied:

$$300 \leq 3As+Sb+Bi+Pb \leq 2372 \quad (1)$$

$$20.4 \leq \{(3As+Sb)/(Bi+Pb)\} \times 100 \leq 110.0 \quad (2)$$

in the formula (1) and the formula (2), As, Sb, Bi, and Pb each represents an amount thereof (ppm by mass) in the alloy constitution.

6. The solder alloy according to claim 1, wherein a formula (4) is satisfied, $$0 \leq Ni+Fe \leq 680 \quad (4)$$

in the formula (4), Ni and Fe each represents an amount thereof (ppm) in the alloy constitution.

7. The solder alloy according to claim 1, wherein both a formula (3) and a formula (4) are satisfied, $$0 \leq Ni/Fe \leq 50 \quad (3)$$

$$0 \leq Ni+Fe \leq 680 \quad (4)$$

in the formula (3) and the formula (4), Ni and Fe each represents an amount thereof (ppm by mass) in the alloy constitution.

8. A solder powder consisting of a solder alloy of claim 1.

9. A solder joint formed by the solder alloy of claim 1.

10. The solder alloy according to claim 1, wherein an amount of As is 14 ppm by mass to 18 ppm by mass.

11. The solder powder according to claim 8, wherein a temperature difference between a liquidus-line temperature and a solidus temperature is 10° C. or less.

* * * * *